United States Patent
Rao

(10) Patent No.: US 7,904,298 B2
(45) Date of Patent: Mar. 8, 2011

(54) PREDICTIVE SPEECH-TO-TEXT INPUT

(76) Inventor: Ashwin P. Rao, Seattle, WA (US)

( * ) Notice: Subject to any disclaimer, the term of this patent is extended or adjusted under 35 U.S.C. 154(b) by 0 days.

(21) Appl. No.: 11/941,910

(22) Filed: Nov. 16, 2007

(65) Prior Publication Data
US 2008/0120102 A1 May 22, 2008

Related U.S. Application Data

(60) Provisional application No. 60/859,689, filed on Nov. 17, 2006, provisional application No. 60/999,565, filed on Oct. 19, 2007.

(51) Int. Cl.
*G10L 15/00* (2006.01)
*G10L 21/00* (2006.01)
(52) U.S. Cl. .......................... 704/270; 704/243; 704/244
(58) Field of Classification Search .................. 704/234, 704/244, 270
See application file for complete search history.

(56) References Cited

U.S. PATENT DOCUMENTS

| 5,293,452 A * | 3/1994 | Picone et al. ................. 704/250 |
| 5,917,890 A * | 6/1999 | Brotman et al. ........... 379/88.01 |
| 5,937,380 A | 8/1999 | Segan |
| 5,956,683 A * | 9/1999 | Jacobs et al. ............... 704/270.1 |
| 6,223,150 B1 * | 4/2001 | Duan et al. ........................ 704/9 |
| 2004/0172258 A1* | 9/2004 | Dominach et al. ............ 704/277 |

* cited by examiner

*Primary Examiner* — David R Hudspeth
*Assistant Examiner* — Justin W Rider

(57) ABSTRACT

This disclosure describes a practical system/method for predicting spoken text (a spoken word or a spoken sentence/phrase) given that text's partial spelling (example, initial characters forming the spelling of a word/sentence). The partial spelling may be given using "Speech" or may be inputted using the keyboard/keypad or may be obtained using other input methods. The disclosed system is an alternative method for inputting text into devices; the method is faster (especially for long words or phrases) compared to existing predictive-text-input and/or word-completion methods.

20 Claims, 32 Drawing Sheets

Type and Speak Mode

Speak and Type Mode

Type and Speak Mode with Error Correction

Speak and Type Mode with Error Correction

Voice-Control-Mode

Auto Mode

Manual Control Mode (Type-and-Speak)

Manual Control Mode (Speak-and-Type)

Fig. 7A:
Method for Searching using Pre-Compiled Search
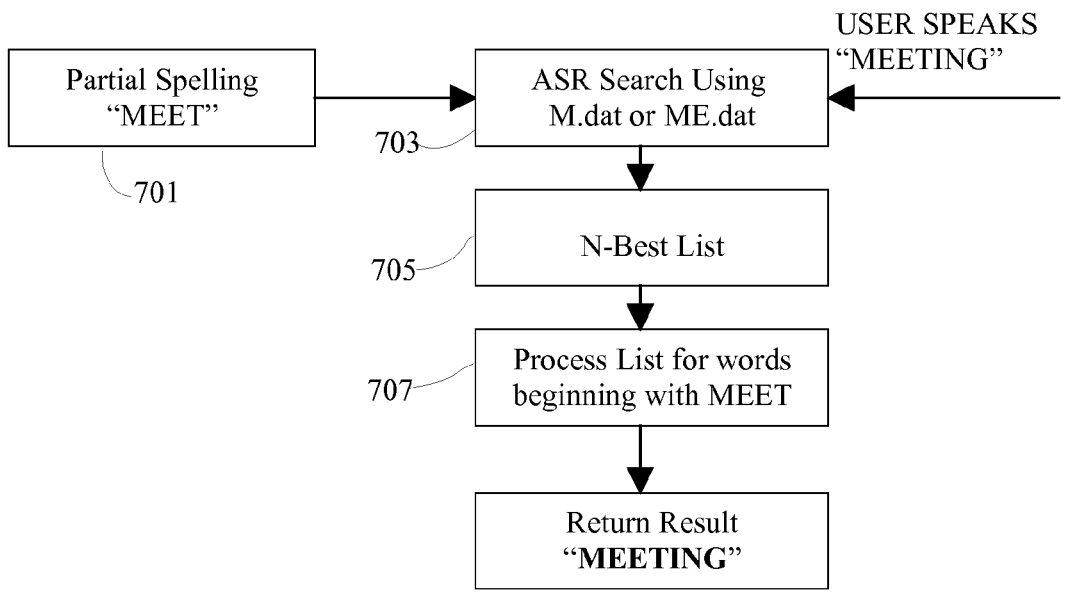
Fig. 7B:
| WORD | PRONUNCIATION |
|---|---|
| MEAL | m i: l= |
| MEALT | m E > l tc t |
| MEALTING | m E l tc t I N |
| MEETING | m i: tc t I N |
Fig. 7C:
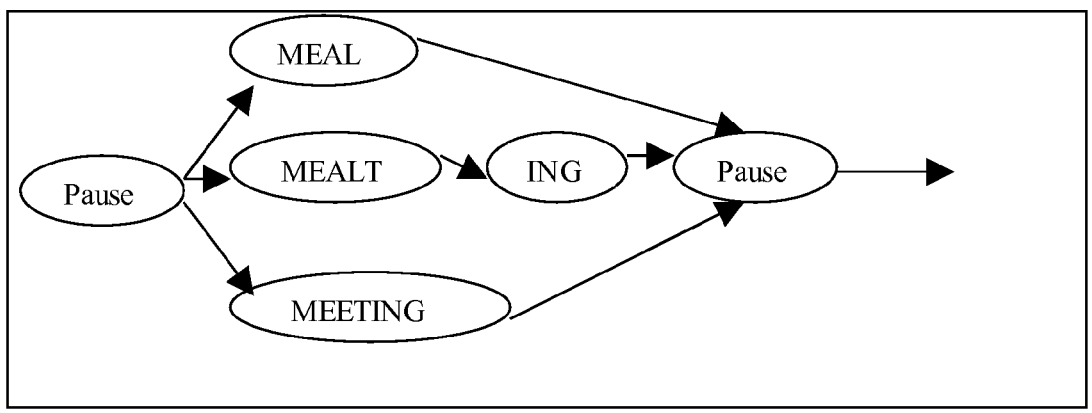

Example-2 for word

Fig. 8C:
Example-1 for Command
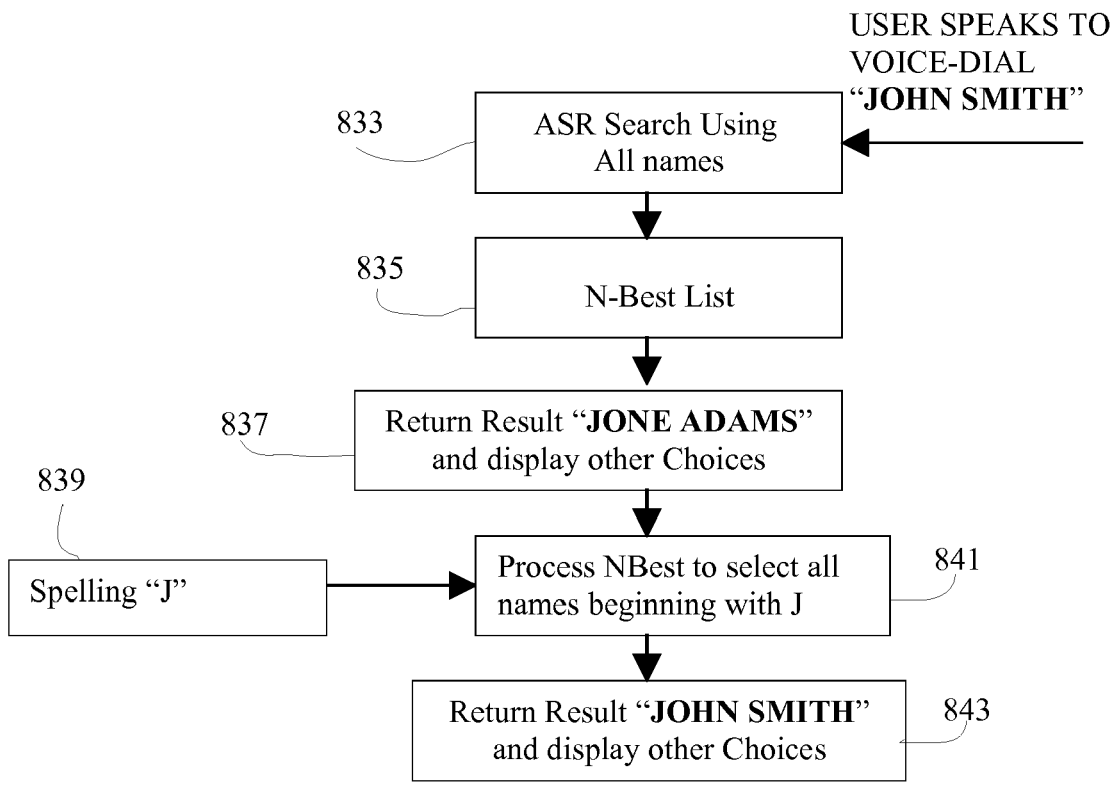
Example-2 for Command
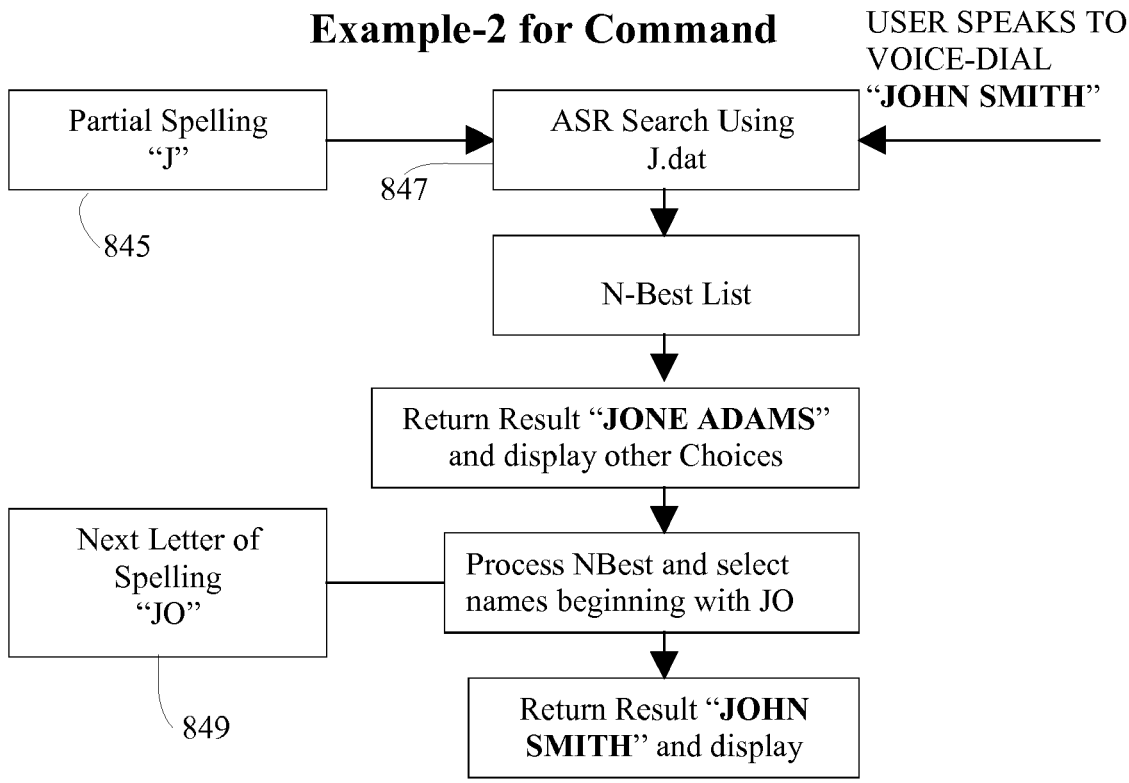

Example 2 of Phrase

Example 3 of Phrase;
spelling corresponds to 1st letter of each word in Phrase

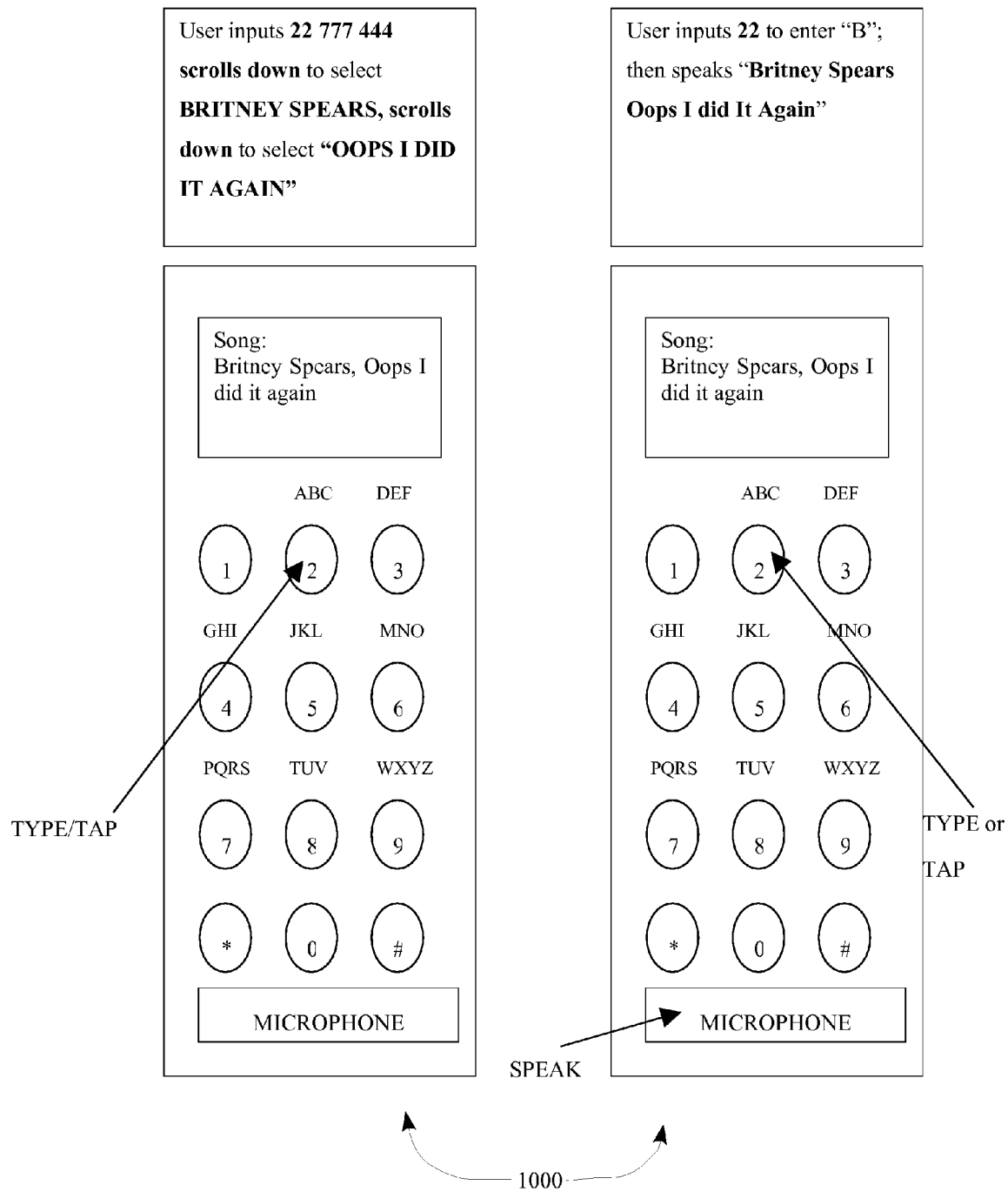

Fig. 14-A
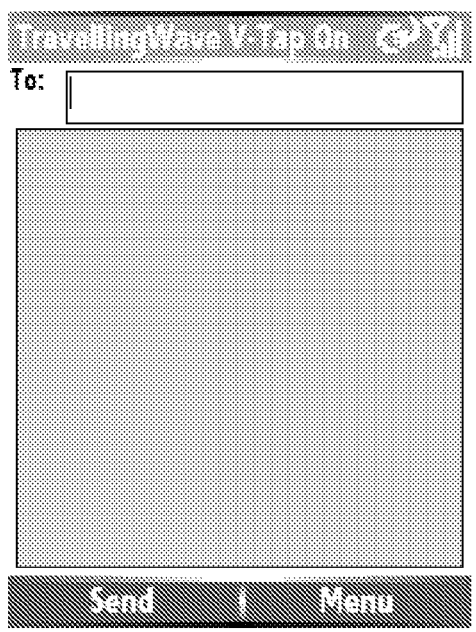
Fig. 14-B
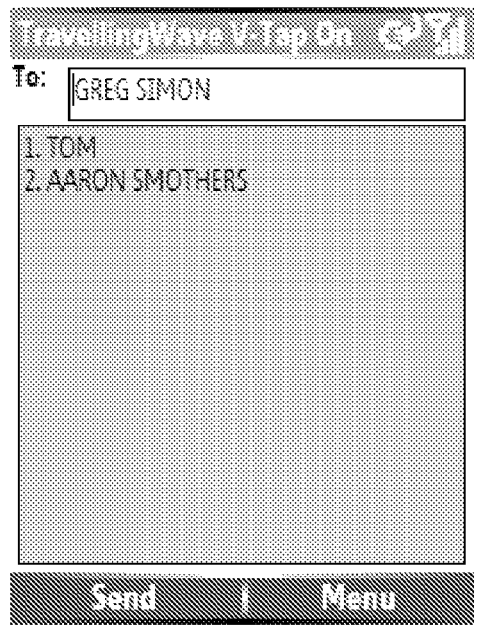
Fig. 14-C
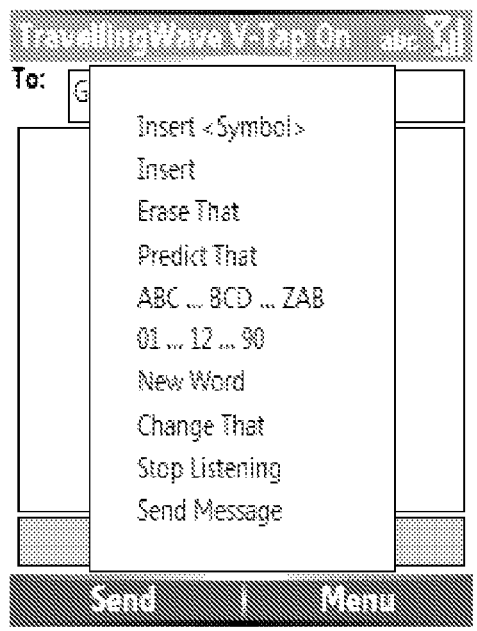
FIG. 14-D
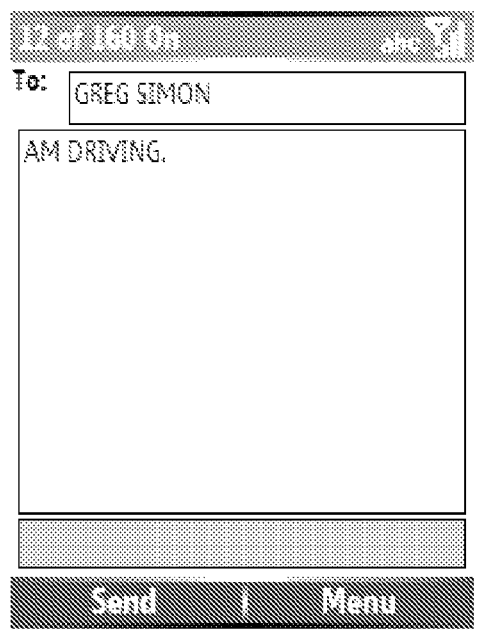

Fig. 14-E
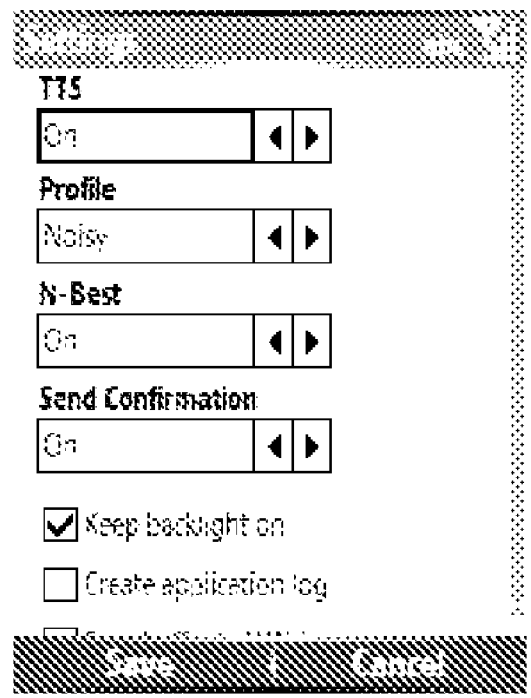

PREDICTIVE SPEECH-TO-TEXT INPUT

CROSS-REFERENCE TO RELATED APPLICATIONS

This patent application claims priority to U.S. Provisional Patent Application No. 60/859,689, entitled "Predictive Speech-To-Text Using Partial Spellings of Text", by Ashwin Rao, filed Nov. 17, 2006, and to U.S. Provisional Patent Application No. 60/999,565, entitled "System and Method for Predictive Speech-to-Text Input", by Ashwin Rao, filed Oct. 19, 2007, both of which are incorporated herein by reference.

FIELD OF THE INVENTION

The invention relates to electronic data input. More specifically, the invention relates to predictive text input and speech recognition.

BACKGROUND OF THE INVENTION

One problem of entering text into devices having small form factors (like cellular phones, personal digital assistants (PDAs), and others like the RIM-Blackberry and Apple-iPod) has existed for a while now. This problem is of specific importance because these devices, given their form-factors, lack a full-size keyboard (found in desktop computers or laptops) and hence inputting text using the alternative input methods is painful and slow. Text Input technologies have many practical mobile applications that include text-messaging (short messaging service or SMS, multimedia messaging service or MMS, email, instant messaging or IM), wireless internet browsing, wireless content search, and mobile personal information management. A brief background on text input technologies is provided next.

Text prediction methods may be broadly classified into three categories: (a) prediction based on unambiguous partial-spelling of the text, also referred to as word-completion, (b) prediction based on ambiguous partial-spelling of text, and (c) prediction based on ambiguous full-spelling of text.

Prediction based on unambiguous partial-spelling of the text: Word completion techniques are typically employed on devices which have some form of a keyboard (examples include mobile devices with a mini-qwerty keyboard as in Blackberry; word-editors running on personal computers, laptops and tablet PCs; personal digital assistants with soft-keys and/or hand-writing recognition software). In these devices, the presence of individual distinct buttons for all characters implies unambiguous input of letters. Obviously, the word completion techniques attempt to predict the word based on partially entered letters corresponding to the spelling of the text; thereby attempting to increase the overall speed of text input.

Prediction based on ambiguous full-spelling of text: Companies like Tegic-T9, Motorola-iTap, ZiCorp-EZiText, Eatoni, and others have introduced variants of predictive text input process for the 9-digit telephone keypad. These methods use the initial typed letters (which are ambiguous because a single key-press may imply any of 3-4 letters) to generate a possible combination sequence, followed by a search against a lexicon of words, to predict the word; which is then displayed onto the mobile-device screen. For instance, using the Tegic-T9 method, a user keys in the characters "C" and "A" (by tapping keys "2" and "2" respectively), and subsequently the process may predict the word "CALL" (although "BALL" may very well be an alternative). Another example is when a user attempts to dial a number using contacts on a mobile device, the user presses the buttons "5" and "6" and the underlying process predicts the name "JOHN". These predictive-text-input methods have proven to increase the speed of text-input compared to standard multi-tap based methods.

Prediction based on ambiguous partial-spelling of text: Tegic-T9 recently introduced an XT9 enhancement which attempts to predict text (a word and/or even the next word) based on ambiguous partial-spelling of that text. This may be viewed as a combination of ambiguous full-spelling based prediction and unambiguous partial-spelling based prediction described above. In addition to standard 9-digit keypad based devices (which are inherently ambiguous inputs because of lack of individual keys for distinct letters) this technology also addresses scenarios wherein users mistype keys on devices having distinct keys. The keys, although distinct, are very small and hence it is likely that a wrong neighboring key gets pressed giving rise to ambiguous inputs.

Speech-to-Text systems attempt to convert spoken text into text with the hope that a user could simply speak an entire sentence and the device could type the same. This technology, also referred to as "continuous speech recognition", has made several advances over the past five decades. Unfortunately, its performance is not satisfactory for wide commercial usage.

SUMMARY OF THE INVENTION

This invention is directed to a system and method for speech-to-text prediction of spoken text. It implements speech recognition by dynamically reducing a large lexicon into smaller search lexicon networks (SLs) to significantly improve recognition accuracies and speeds; by dynamically switching the SLs which results in an efficient and practically realizable system; by storing a copy of the spoken utterance or the text's equivalent acoustic representation for successive predictions and error-corrections, noting that the SLs result in increased recognition accuracies and speed of speech recognition for successive predictions and error-corrections. In particular, the invention (a) takes as input the speech waveform corresponding to the spoken text (word or a sentence), (b) takes as input the initial letters corresponding to the spelling of that text (inputted by a user using the key-pad or keyboard or pen/stylus or Speech) and, (c) dynamically reduces the size of the active lexicon based on the initial letters provided, (d) searches that reduced lexicon (the Search Lexicon or SL) for the best matching text (perhaps using standard acoustic pattern matching techniques or a dual-pass technique), (e) returns the predicted text to the user interface, and (f) continues the loop from step (b) until the correct word appears and/or the user selects to go to next word.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7A illustrates a process for Searching using Pre-Compiled Search;

FIG. 7B illustrates an example of a Search Dictionary for use in the process illustrated in FIG. 7A;

FIG. 7C illustrates an example of a Search Word-Graph for the example Search Dictionary shown in FIG. 7B;

FIG. 8C illustrates two examples produced with the system for Multiple-Recognition and Processing and Error-Correction for a command;

FIG. 13 illustrates an example of performing a Music Download;

FIGS. 14A-14E illustrate another example of one embodiment;

DETAILED DESCRIPTION OF EMBODIMENTS

It will be appreciated by those skilled in the art and others that a typical speech recognition system (also referred to as an Automatic Speech Recognizer or ASR) operates by accessing audio data through a microphone/soundcard combination, processing the audio data using a front-end signal processing module to generate feature-vectors, and subsequently doing pattern-matching in a search module using knowledge from acoustic-model(s) and language-model(s). The system itself may exist as software or may be implemented on a computing device such as a conventional embedded system; and thus may include memory (ROM, RAM etc.), storage, processors (fixed-point, floating-point etc.), interface ports, and other hardware components.

A general discussion of "multimodal input" may be helpful before discussing the embodiments in detail. With "multimodal input", the idea is to use Speech in conjunction with the keyboard/keypad. For instance, a user could simply "Press Keys to input B" and speak "BEAUTIFUL" and the word "BEAUTIFUL" is displayed on the screen. As another example, a user could speak "Britney Spears" and then type "B R I" to play a song by Britney Spears. In general, multimodal methods have serious limitations: (a) their accuracies are unsatisfactory, (b) they are not practical to implement on mobile hardware platforms, and (c) they are not fast enough. Hence, there is not a single multimodal input method for text entry in existence in today's mobile devices.

In a speech recognition system, as the number of words forming the so-called active dictionary/lexicon increases, the recognition accuracy drastically suffers. For instance, currently available commercial ASR technologies perform satisfactorily as long as the number of words in the active lexicon is around 500; consider for instance voice-dialing with a dictionary of 500 stored names. More generally, current ASR systems have proven to be practically useful for limited context "command-and-control" applications, namely voice-dial (typically 200-500 names), content search (1000-5000 song titles) and so on. Although there are ASR systems handling millions of words which employ language and context modeling, the technology generally fails to deliver satisfactory results when the "active" lexicon is large, for instance 32000 SMS words, or 5000 names, or 20000 song titles and so on. The primary reasons for this are (a) increased computation power is required as the active lexicon increases beyond 1000 words and (b) the acoustic confusion between words increases as the lexicon increases which reduces speech recognition accuracy.

Figure 1:
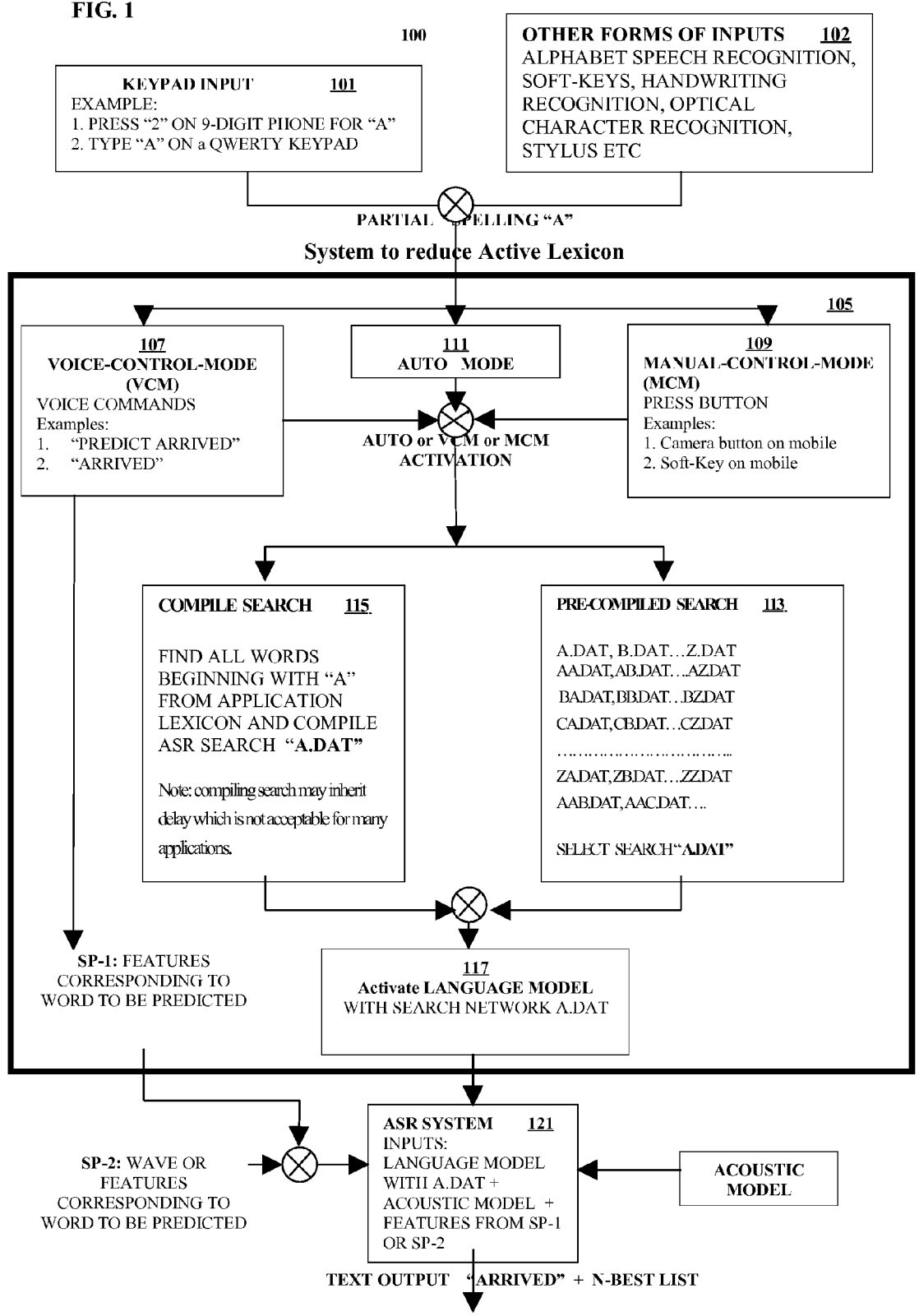
FIG. 1 is a conceptual overview of a system for predictive speech-to-text.

Turning now to FIG. 1, a conceptual overview of a system 100 for predictive speech-to-text is shown. The system is implemented as an overall speech recognition system for predicting text using partial spelling of that text. The text is provided to the system using a plurality of input methods (hence the multimodal nature of the embodiment). As shown, the system 100 accepts input from a keypad input 101 and other forms of input 102. Examples of the keypad input 101 include any form of keypad, such as a common 9 or 12 button telephone keypad. Examples of the other forms of input 102 include speech, additional keypads, soft-keys, handwriting recognition, Qwerty keyboard, soft-keyboard, or the like.

The system 100 includes a sub-system for reducing the active lexicon 105. The system to reduce the active lexicon 105 may operate in voice control mode 107, manual control mode 109, or may be an automatic mode 111 wherein the system reduces the active lexicon as soon as a user inputs the letters using the keypad input 101 or other input 102. In voice control mode 107, the system 100 recognizes that input recognition is being requested based on a spoken command, such as by a user speaking a known command like "predict." In manual control mode 109, the system 100 recognizes that recognition is being requested based on a keypress, such as a special purpose button (e.g, a camera button on a mobile phone) or a soft-key. In auto mode 111, the system 105 may automatically initiate recognition, such as by waiting for keys to be pressed (or letters to be spoken) and automatically reducing the lexicon. In one specific embodiment, the system 100 may listen only if a button is not otherwise being pressed.

A pre-compiled search module 113 includes pre-compiled search networks for use in recognizing speech. The pre-compiled search networks each include a subset of words from the total word library. The subset search networks include text beginning with a pre-determined initial letter-combination(s). For example, different pre-compiled search networks may exist that each include the speech recognition data for those words that begin with a particular letter, such as one network for "A", another network for "B", another network for "C", etc. Still other pre-compiled search networks may be used for those words that begin with particular letter combinations, such as "AA", "AB", "AC", "BA", "BZ", etc. The sub-set search networks are pre-compiled to eliminate computation during run-time. One process for building these pre-compiled search networks is illustrated in FIG. 6, and described below. Alternatively, the search networks can be compiled real-time 115, using variations of the process illustrated in FIG. 6.

A particular pre-compiled search network is activated 117 based on the letter(s) being received from the keypad input 101. In other words, if the character being keyed is "A", then the pre-compiled search network 113 corresponding to words beginning with "A" (which may be named "A. DAT") is activated 117. It should be appreciated that in certain instances, a keypad button may be associated with more than a single character. For example, the same button on a keypad may be associated with all three of the letters A and B and C. In such a case, a single key press may result in activating three pre-compiled search networks 113.

The ASR system 121 includes code to compare spoken text to the active search network. The ASR system 121 includes language and acoustic facilities for comparing a spoken utterance with known speech data in order to identify the inputted spoken utterance.

Generally stated, the system 100 operates by (a) receiving typed letters that correspond to the spelling of the text being recognized, (b) pre-determining a mode (which could be Auto or Voice-Control-Mode or Manual-Control-Mode, noting that a keypad may be replaced by any other manual input method) to activate a module for reducing the overall system lexicon, (c) based on the determined mode, reducing the system lexicon into a small active lexicon (where lexicon implies a set of words and their phonetic descriptions) containing words beginning with the typed letters obtained in step (a) by either building a pre-compiled sub-set search network or by activating the recognition system with a pre-compiled sub-set search network, (d) activating a language model (sometimes referred to as "grammar" or "statistical language model") with the active lexicon search network along with other components forming a standard ASR language model, and (e) using the ASR language model in conjunction with the spoken utterance (corresponding to the text to be predicted) and other standard ASR components like acoustic and duration and other models and search algorithms to generate the desired text as the predicted output. Since the disclosed system uses partial spelling of text inputted by a user to select one of the pre-compiled search networks, thus result is increased recognition speeds and accuracies, even for subsequent error-correction and successive predictions using speech (inputted by a user) stored in memory. A specific example of identifying the word "ARRIVED" is considered in FIG. 1.

Those skilled in art will appreciate that a plurality of variants of the proposed invention may be plausible. For instance, instead of the beginning letters forming the spelling of the text, a combination of beginning and ending letters (as in first and last letters) may be entered by the user. Further, although unambiguous spelling input is taken as an example to describe the invention, extension to ambiguous spelling input is fairly straightforward. For instance, if one types 2 and says "CALL" or alternatively one says "CALL" and types 2, the system may be easily extended to account for the fact that "2" may mean "A" or "B" or "C"; in that case the pre-compiled sub-set search networks (example ABC.dat) may correspond to all sub-set words beginning with A, B, C. As another example, if user says "CALL" and subsequently begins to speak the spelling namely "C", then the system may be easily extended to account for the fact that spoken "C" may be mis-recognized by an ASR system to be "D" or "E" or "G" or "P" or "T" and so on; in that case the pre-compiled sub-set search networks (example C.dat) may correspond to all sub-set words beginning with C, D, E, G, P, T.

In general, ambiguous input may be addressed by combining words with all or most possible ambiguous letters into a single pre-compiled network. Those skilled in the art can easily appreciate that the "word" mentioned in the previous section may be replaced by any word or more generally any phrase or any text in any language, without deviating from the general logic of the system in FIG. 1.

Figure 2A:
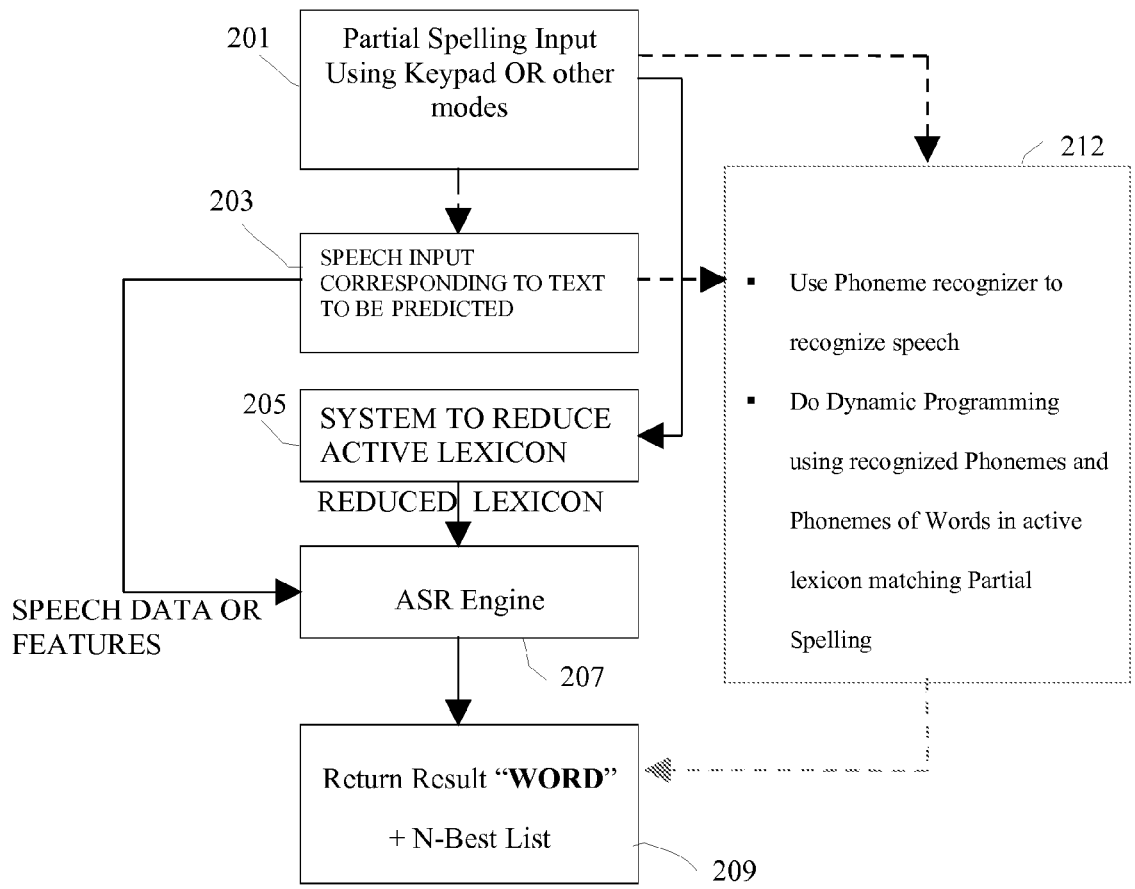
FIG. 2A illustrates one embodiment of the system described in FIG. 1 implemented in a Type-and-Speak Mode.
Figure 2B:
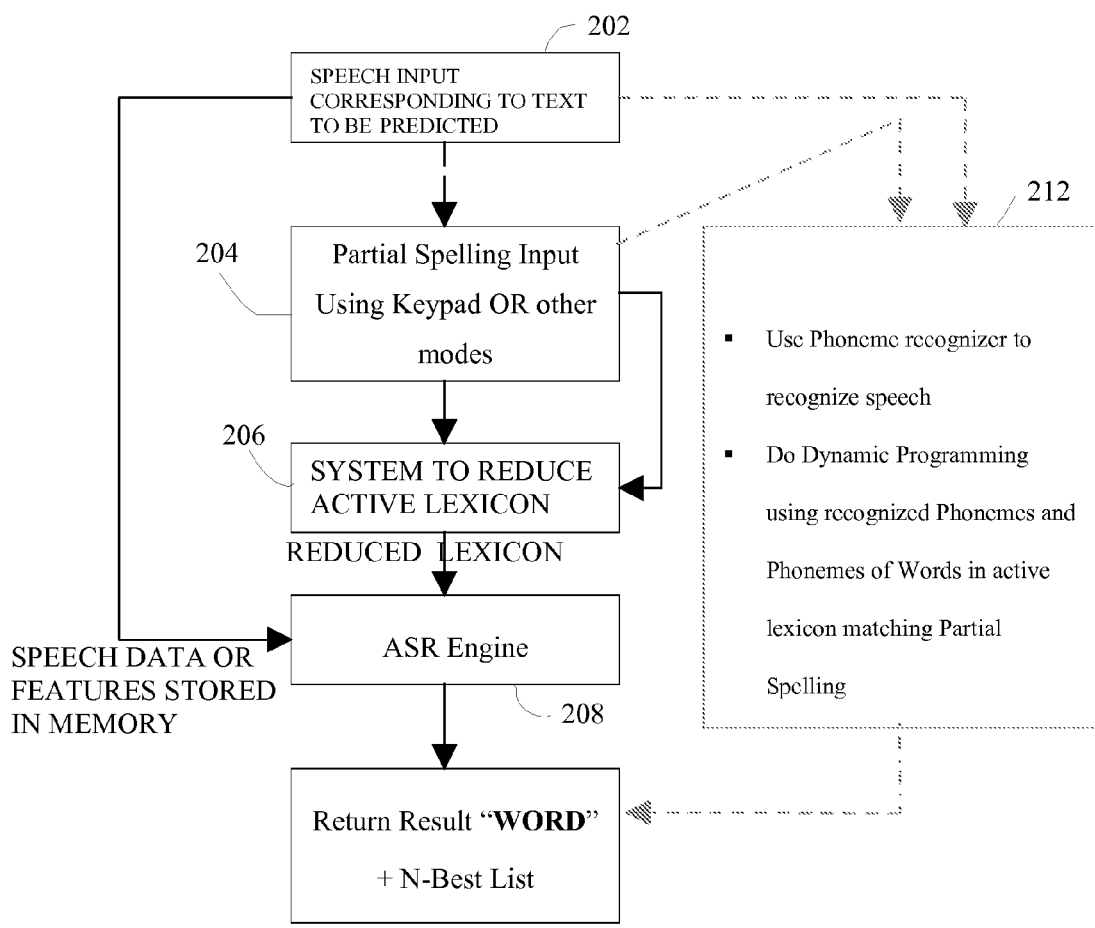
FIG. 2B illustrates another embodiment of the system described in FIG. 1 implemented in a Speak-and-Type Mode.

In FIGS. 2A and 2B, embodiments of the operating of the system shown in FIG. 1 are illustrated. First, in FIG. 2A, one embodiment is implemented that uses a type-and-speak mode, meaning that the user begins typing letters and then speaks an utterance to be identified. As shown, the user begins partial spelling input using the keypad or other input mechanism (block 201). In response, the system uses the keypad-provided text to reduce the system lexicon to an active reduced lexicon (block 205).

In addition, the user begins speaking an utterance (speech input) that corresponds to the text to be predicted (block 203). That speech input is passed to the ASR engine, together with the active reduced lexicon, for processing (block 207). The ASR engine compares the speech input to the reduced lexicon that was identified from the keypad input, and outputs the result. In one embodiment, the result could be the actual recognized word or phrase, or it could be a list of best-matching results (called N-best) that includes a grouping of words that are most likely correct.

In FIG. 2B, another embodiment is implemented that uses a speak-and-type mode, meaning that the user begins speaking and then begins typing letters. The embodiment illustrated in FIG. 2B operates in a similar fashion to the embodiment illustrated in FIG. 2A, with the exception that in FIG. 2B, the user begins speaking first (block 202) and then begins typing text (block 204). Accordingly, the speech input is stored in the ASR engine (block 208) when received and is not processed until after an active reduced lexicon is identified from the typed input (block 206).

Referring both to FIGS. 2A and 2B, the embodiments could use a traditional phoneme-recognizer 212 as opposed to a word-recognizer. However, with phoneme recognition with large system vocabularies (of the order of 1000 to 10,000 and more words/phrases), the inaccuracies would result in inaccurate selection of candidates from the system vocabulary. Accordingly, the preferred approach is to reduce the lexicon based on the partial-spelling obtained as described in FIG. 1 to an active lexicon which is relatively small (500-1000 compared with 5000-10000). This not only increases recognition accuracies but also results in a practical real-time system, especially for implementation on devices with small form factors.

Figure 2C:
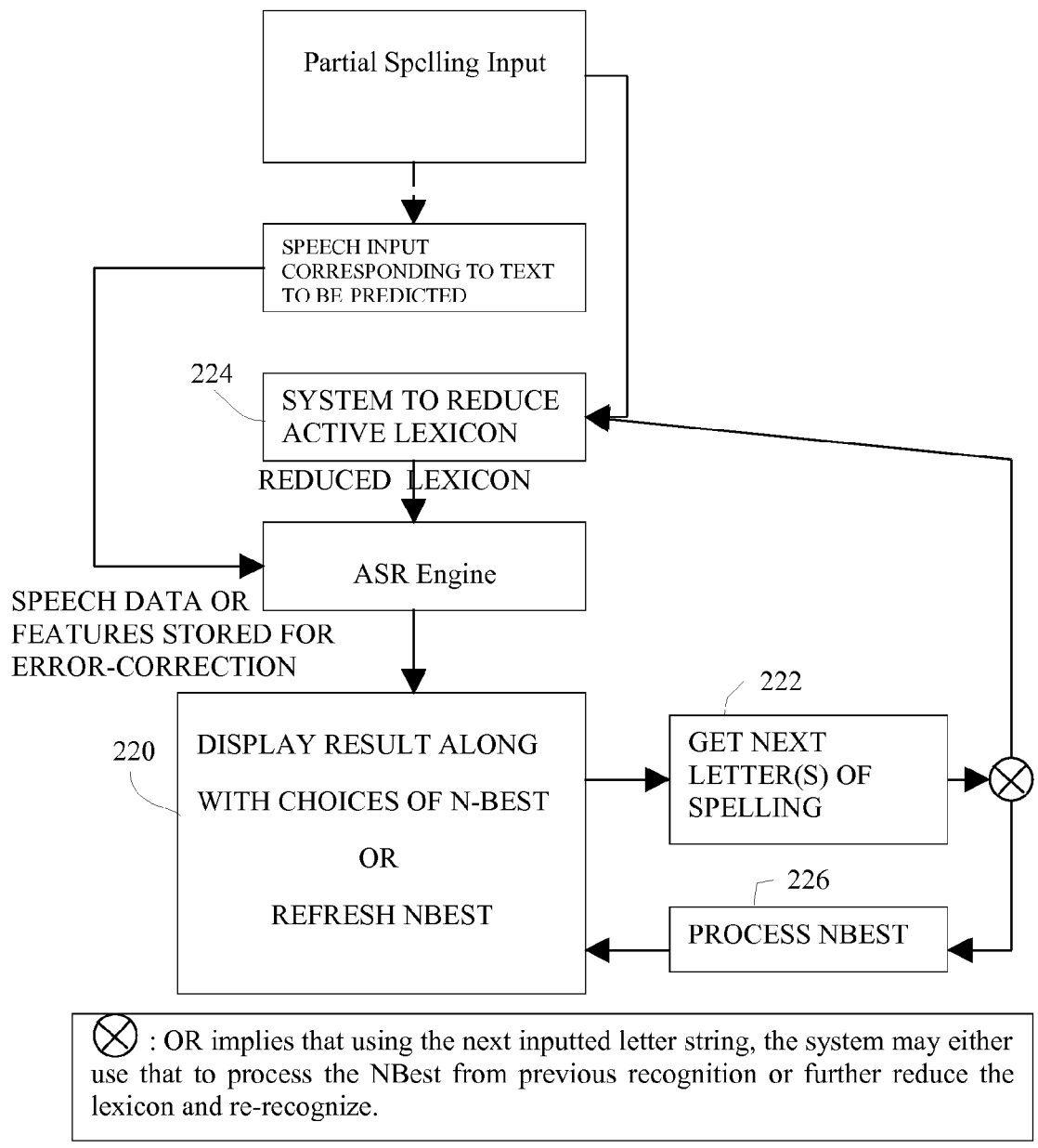
FIG. 2C illustrates another embodiment of the system described in FIG. 1 implemented in a Type-and-Speak Mode with Error Correction.
Figure 2D:
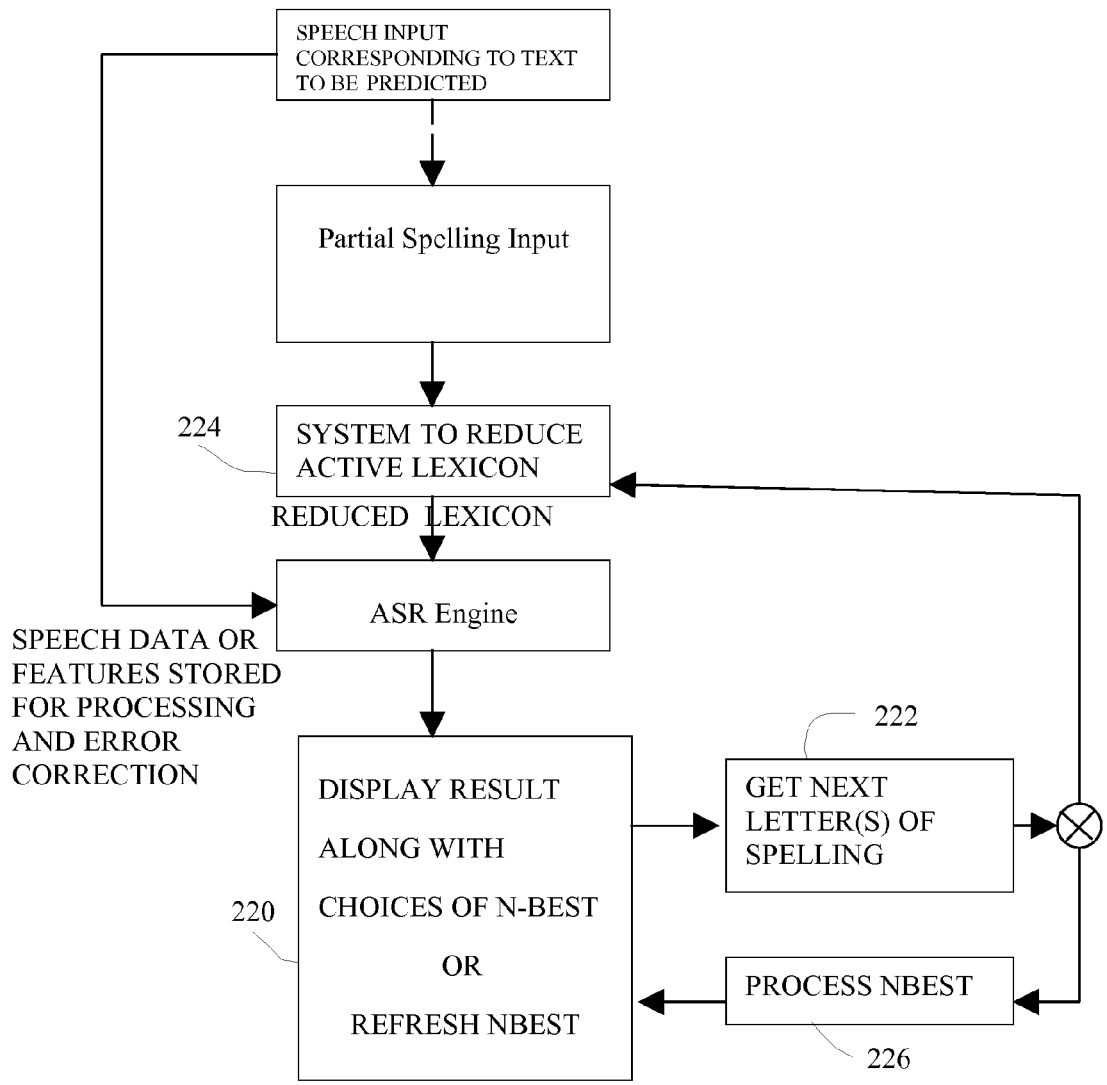
FIG. 2D illustrates another embodiment of the system described in FIG. 1 implemented in another Type-and-Speak Mode with Error Correction.

FIGS. 2C and 2D add error-correction to the embodiments shown in FIGS. 2A and 2B respectively. As shown in both examples, the result of the ASR engine is displayed along with the N-best choices (block 220). If the user inputs an additional letter (block 222), then the system can either use that additional letter to further reduce the active lexicon (block 224) and re-recognize, or to process the N-best list if the user's further input does not invalidate the N-best list. The choice between reducing SLs and processing NBest depends on the actual application under consideration. For instance, for an sms-dictation application handling about 25,000 words, there are very few words existing in the four letter combination SLs; hence it is preferred to process NBest after 3 letters for this application.

Figure 3A:
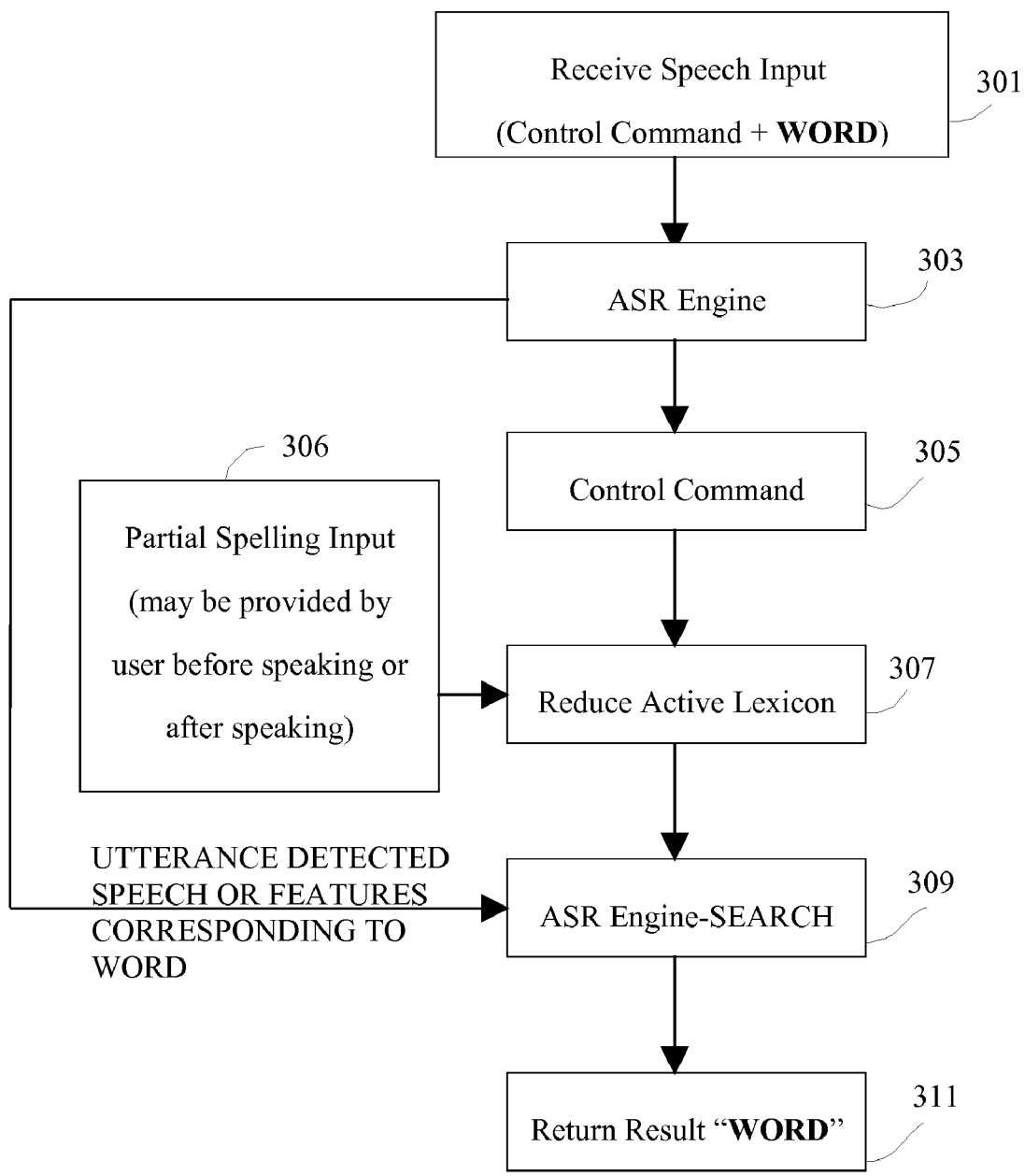
FIG. 3A illustrates another embodiment of the system in FIG. 1 that uses Voice-Control-Mode.

In FIG. 3A, a detailed description of the Voice-Control-Mode module 107 introduced in FIG. 1 is described. Speech input is received as a speech utterance that includes both a control command and a "word" (block 301). The ASR engine detects the speech input and stores the uttered "word" for later recognition (block 303). If the control command is detected, recognition begins (block 305). The user begins inputting text using a manual text entry mechanism, such as a keypad (block 306). The manual text entry is used to reduce the active lexicon (block 307). With the active lexicon reduced, the ASR performs the recognition operations to identify the "word" (block 309).

Observe that two ASR systems are used and multi-pass recognition is performed as depicted in FIG. 3A. Alternatively, parallel recognizers may be employed if the hardware permits resources to do so. Specifically it is shown in FIG. 3A that the first pass ASR is primarily looking for a control command (like "Predict" or "Complete" or any other control command) based on which it activates the module for lexicon reduction; those skilled in art will recognize that typically there may be other commands or grammars that the ASR system is processing (for instance for inserting symbols, or contacts, or sending message commands, or help commands or for simply rejecting background noise etc) and hence the requirement for having a control command; if Prediction of Text is the only problem being addressed then there is no need for a control command because the word itself may act as a control command. A second ASR system uses this reduced lexicon along with the utterance to be recognized and yields the desired predicted word. Notice that to relax user-constraints, FIG. 3A assumes the user would say the control command and the word in a single utterance and the second ASR system uses the waveform/features corresponding to this utterance (assuming utterance detection is done and/or other forms of utterance alignment to control-command and word are done) for prediction. A specific example of this system for the word "MEETING" is shown in FIG. 3B.

Figure 3B:
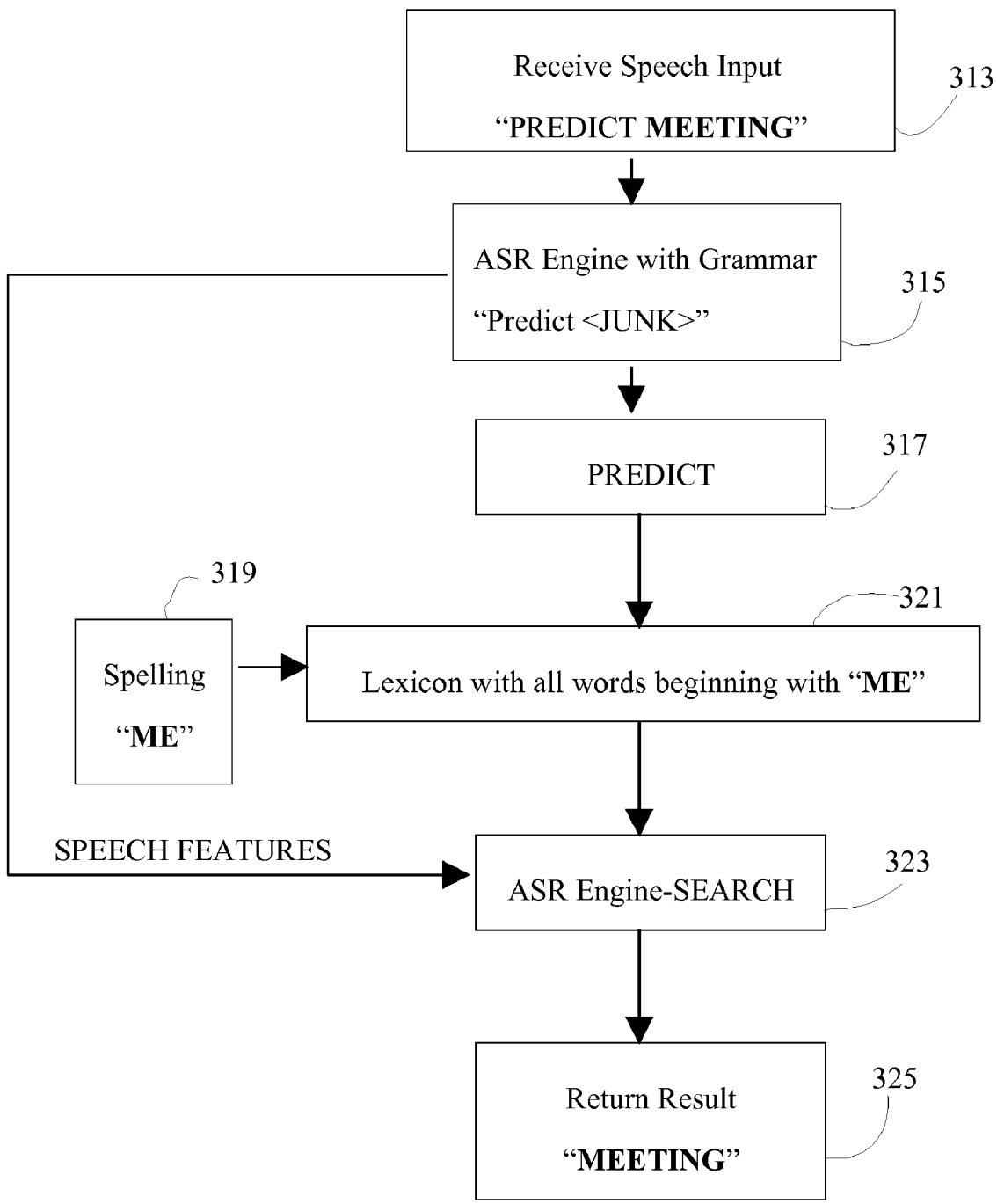
FIG. 3B illustrates an example of the embodiment shown in FIG. 3A.

As illustrated in FIG. 3B, the user utters the phrase "predict meeting" (block 313). The ASR engine identifies the control command "predict" in the utterance (block 315). Those skilled in art will recognize that <Junk> is a typical word-spotting grammar employed to detect just about any text. The ASR engine may then immediately begin attempting to recognize the word "meeting" while it awaits user manual input (block 317). As the user begins keying in letters for the word "meeting" (block 319), the active lexicon is continuously reduced to only those words that begin with the letters "me" (block 321). The ASR engine performs the recognition using the reduced active lexicon network to identify the word "meeting" (block 323). The ASR engine returns the result (block 325).

Figure 3C:
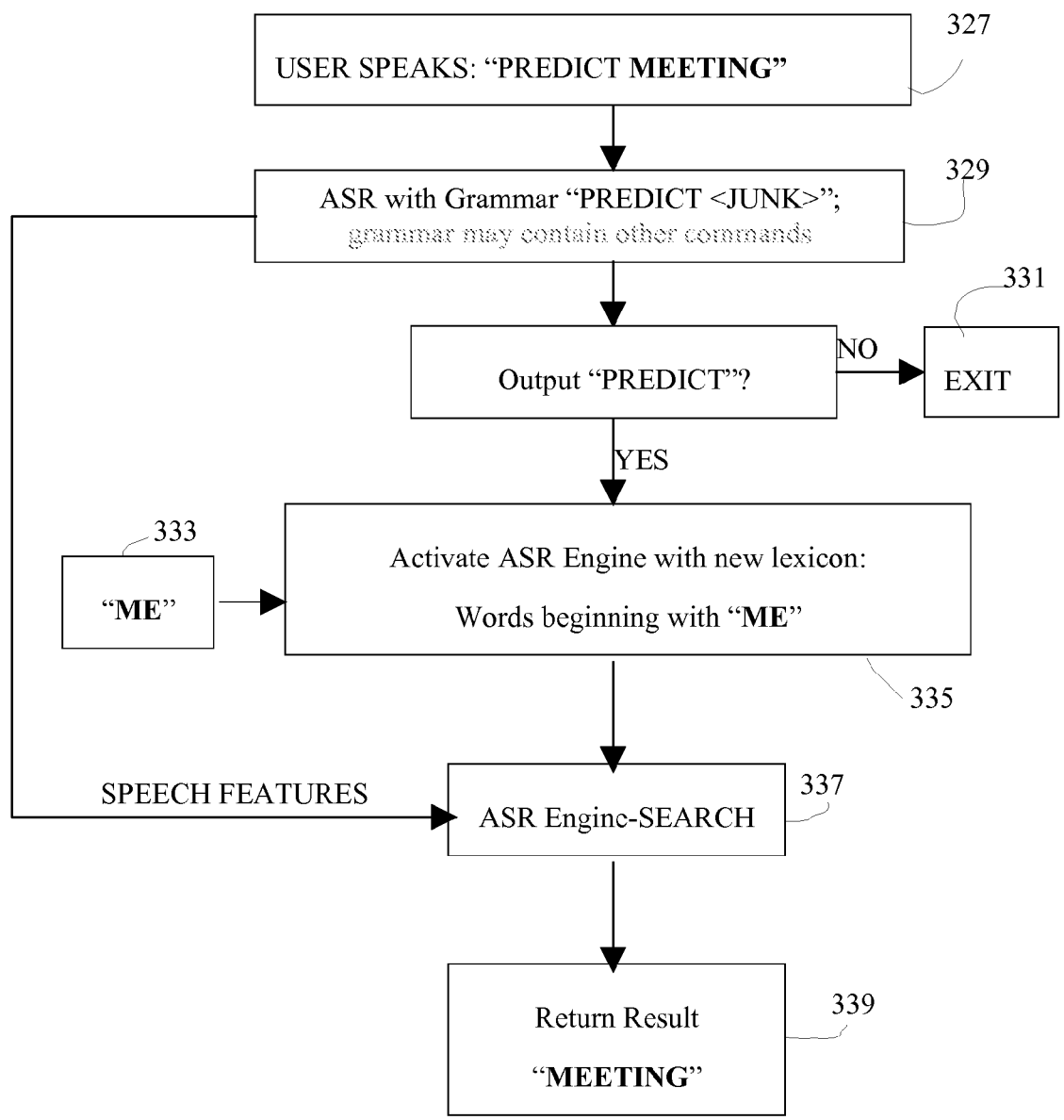
FIG. 3C illustrates one embodiment of a process for implementing the example illustrated in FIG. 3B.

In FIG. 3C, a detailed description of the process underlying the system in FIG. 3A/3B is described. In this example, the user speaks the control command plus some word to be recognized (block 327). The ASR engine detects the control command and stores the utterance to be recognized (block 329). Note that the speech input may include multiple control commands. If the output is in fact the word "predict", then the process ends (block 331). However, if the output is not the word "predict", then the ASR engine is activated using the active lexicon reduced based on the user's manual input (blocks 333 and 335). Using the reduced active lexicon network, the ASR engine performs recognition on the word from the original speech utterance (block 337). The ASR engine returns the results (block 339).

Observe that in order to facilitate a simple user-interface for the end-user, a single command consisting of the control-word and the text to be predicted is assumed. As an example, instead of having the user say "Predict" and then the word "Meeting", a single utterance of "Predict Meeting" may be adopted. Using standard ASR processes (typically used for Rejection and/or Word-Spotting) the control word is first extracted; this is because typically one may have other competing grammar paths like commands, help, alphabet, phrases etc along with the control-command grammar path. If the control word is the expected control word (Predict in this example) then the second ASR module is activated with the reduced lexicon (for simplicity this is not shown in detail; it's the same as obtained in FIG. 3A) and the output of the Search is returned in the form of a best-scoring hypothesis and a list of alternate hypothesis; this list would include the text that the user intended to predict by speaking.

Figure 4A:
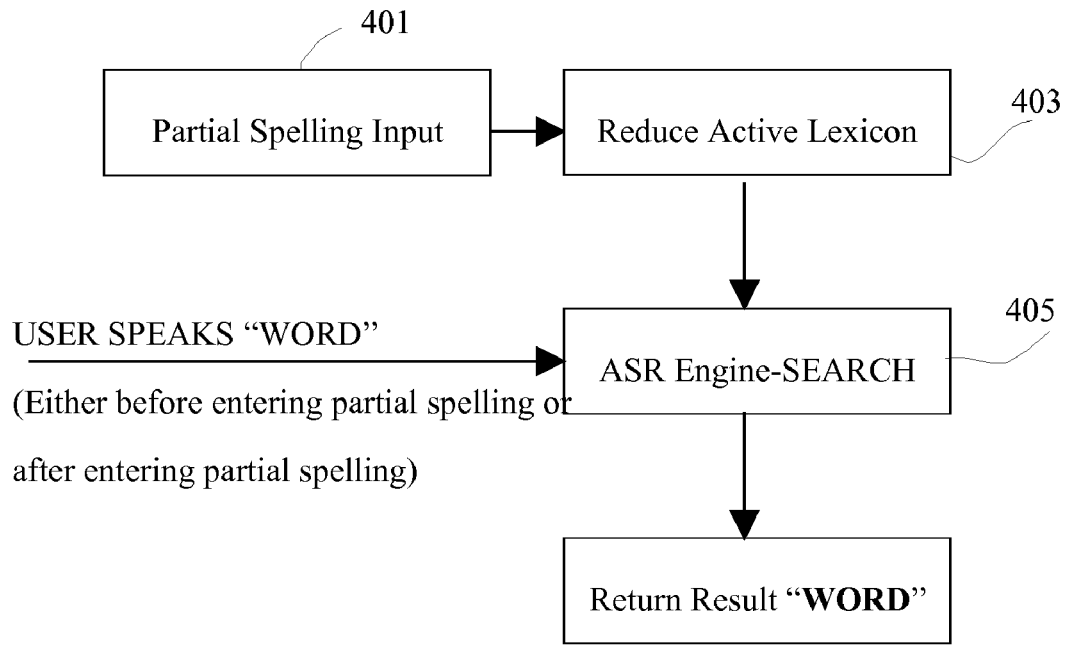
FIG. 4A illustrates one embodiment of the system in FIG. 1 that uses Auto-Mode.

FIG. 4A shows an embodiment of the system in FIG. 1 implemented using Auto-Mode. This implementation is simpler than the Voice-Control-Mode illustrated in FIG. 3. It simply reduces the lexicon at each instant that the user has provided new input (block 403). This could be done based on tracking the output of a screen (using standard software methodologies) or by tracking the events from the user (received in the form of speech/keypad-activation/other) (block 401). This implementation suffers some drawbacks compared to the more complex system illustrated in FIG. 3. Those drawbacks are (a) redundant processing is performed which may not be practical on devices like cellular phones (considering practical issues like CPU delay, processing power, battery life etc.), (b) the redundant processing may interfere with keypad inputs, (c) the keypad inputs and background noise may result in noise in the user's speech, (d) if using speech to input letters of the spelling, the recognition of this and other base commands like Symbols etc may become slower, (e) if using speech to input letters of the spelling, the overall recognition accuracy may decrease. However, one advantage of this approach is that it could use a single pass ASR engine (block 405) especially for first pass recognition with increased recognition speed and further has a more intuitive user interface for the end application.

Figure 4B:
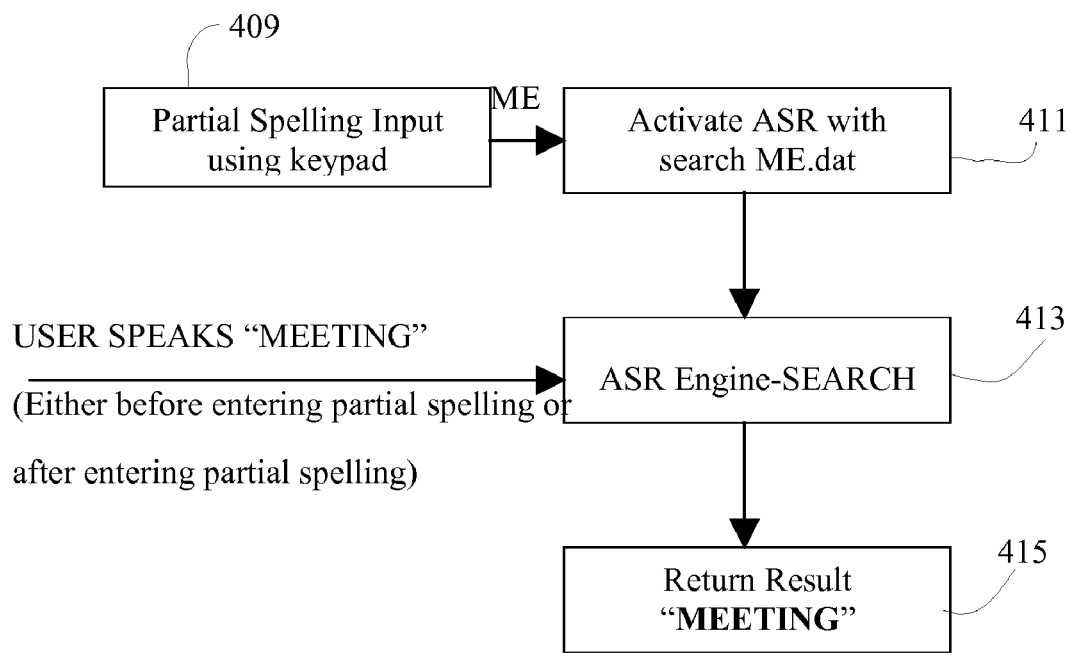
FIG. 4B: illustrates an example of the embodiment described in FIG. 4A

A specific example for this is illustrated in FIG. 4B. The user begins typing the characters "ME" (block 409). The system activates the reduced lexicon that is associated with the combination of letters "ME" (block 411). When the user begins speaking the word "Meeting", the ASR engine begins comparing the utterance to the ME reduced lexicon (block 413). Because the number of possible options is drastically reduced in the active lexicon, the ASR engine can more quickly and accurately identify the proper word and return the result (block 415).

An alternative approach that uses a Manual-Control-Mode is shown in FIGS. 5A-5D. Here, the reduced lexicon module is initiated only on receiving a control signal just like in the system illustrated in FIG. 3. However, instead of relying on a Voice-based control signal, a manual control signal method is adopted. Hence, a user may simply press a button (for instance the Volume button or the Microphone ON/Off button or Tap onto a keypad button and other variants like tap onto the screen of a PDA etc) and initiate the Lexicon reduction module. This system is simpler than the one with VCN; it uses only one ASR module. However, it may require the user to do an additional "manual step" especially in the Type-and-Speak mode.

Figure 5A:
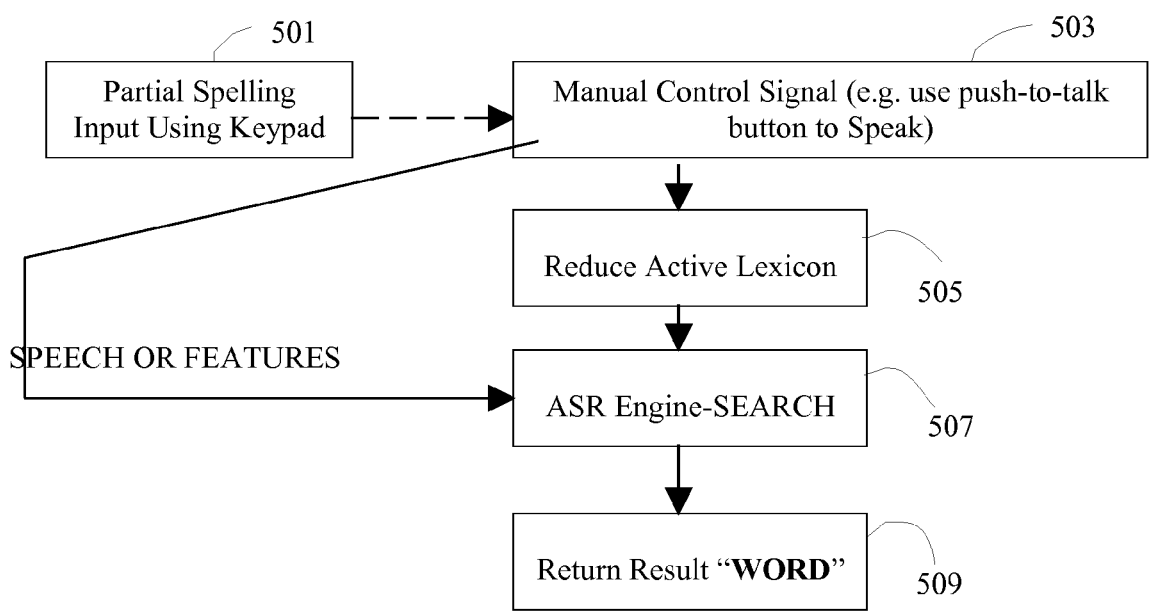
FIG. 5A illustrates another embodiment of the system shown in FIG. 1 implemented in Manual Control Mode.

Referring first to FIG. 5A, the user begins partial spelling input using the keypad (block 501). Either that particular input, or a special button, is used to manually indicate that text recognition is being requested (block 503) and the user provides speech input. Accordingly, the input provided by the user is used to reduce the active lexicon (block 505), and the ASR engine begins to perform the recognition of the speech input using the active reduced lexicon network (block 507). The results are returned (block 509).

Figure 5B:
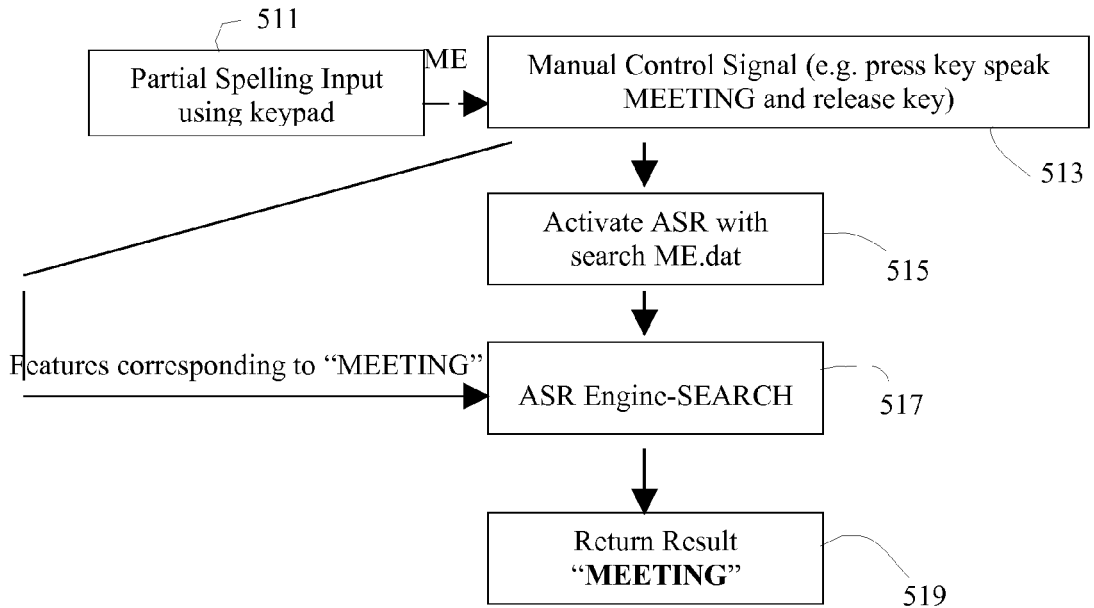
FIG. 5B illustrates an example of the embodiment shown in FIG. 5A.

FIG. 5B illustrates a specific example. As shown, the user begins typing the characters "M" and "E" (block 511). The user then presses the control button to indicate that speech is being provided (block 513) and begins speaking the word "meeting". The Appropriate reduced lexicon is activated based on the user's keypad inputs, resulting in the lexicon associated with words beginning with the letters M and E being activated (block 515). The ASR engine then identifies the word "meeting" by comparing the speech utterance to the ME lexicon (block 517), and returns the results (block 519).

Figure 5C:
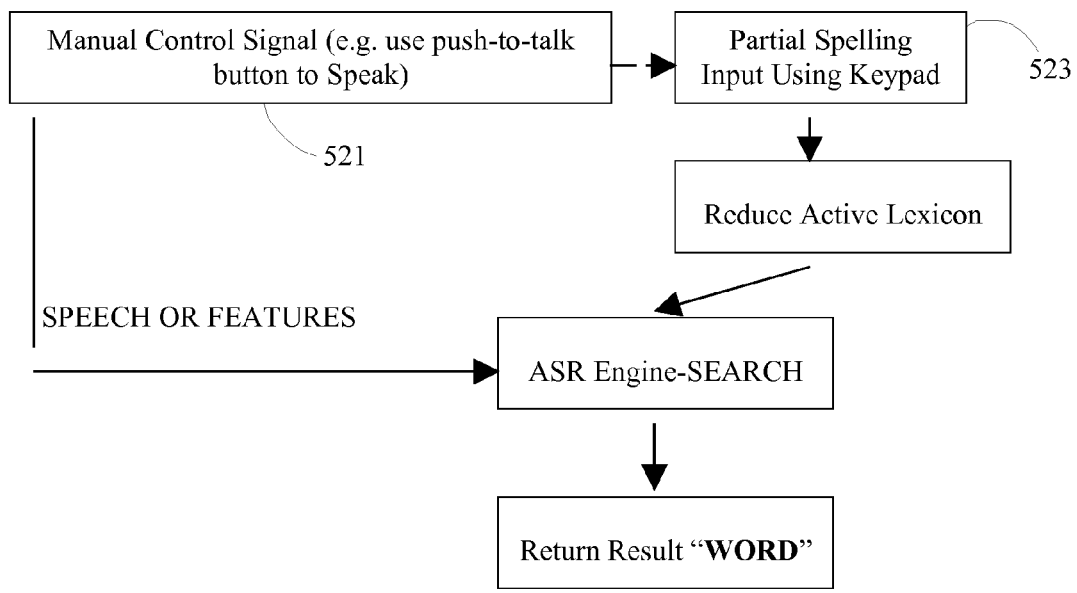
FIG. 5C illustrates another embodiment of the system shown in FIG. 1 implemented in Speak-and-Type Mode.

FIG. 5C illustrates an example of the manual control mode implemented using speak-and-type. The process illustrated in FIG. 5C is similar to the process illustrated in FIG. 5A, except that the user first presses the manual control and speaks (block 521) and then begins to type characters (block 523). The balance of the process occurs similar to that illustrated in FIG. 5A.

Figure 5D:
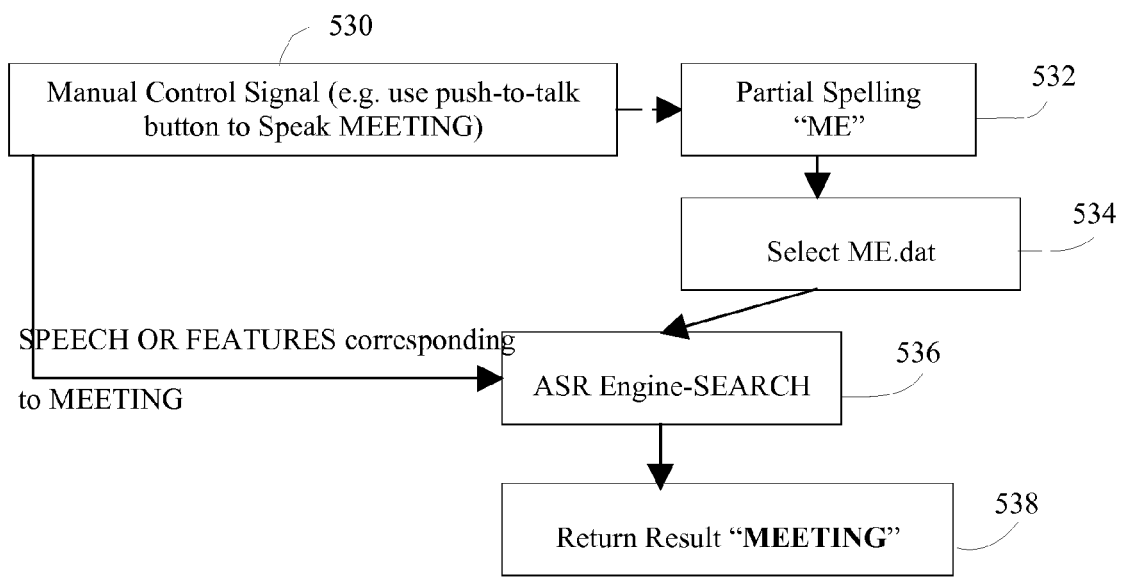
FIG. 5D illustrates an example of the embodiment shown in FIG. 5C.

FIG. 5D illustrates a specific example. As shown in FIG. 5D, the user initiates the process by keying the manual control signal, such as a button (block 530), and provides the spoken utterance "meeting". The user then begins entering text the characters "M" and "E" using the keypad (block 532). The system activates the lexicon associated with the characters "ME" (block 534), and the ASR engine begins its recognition process (block 536). The resulting word "meeting" is returned (block 538).

In general, the choice of any of the three methods (referring to FIGS. 3, 4, 5) depends on user preferences, hardware limitations, application limitations etc.

Figure 6A:
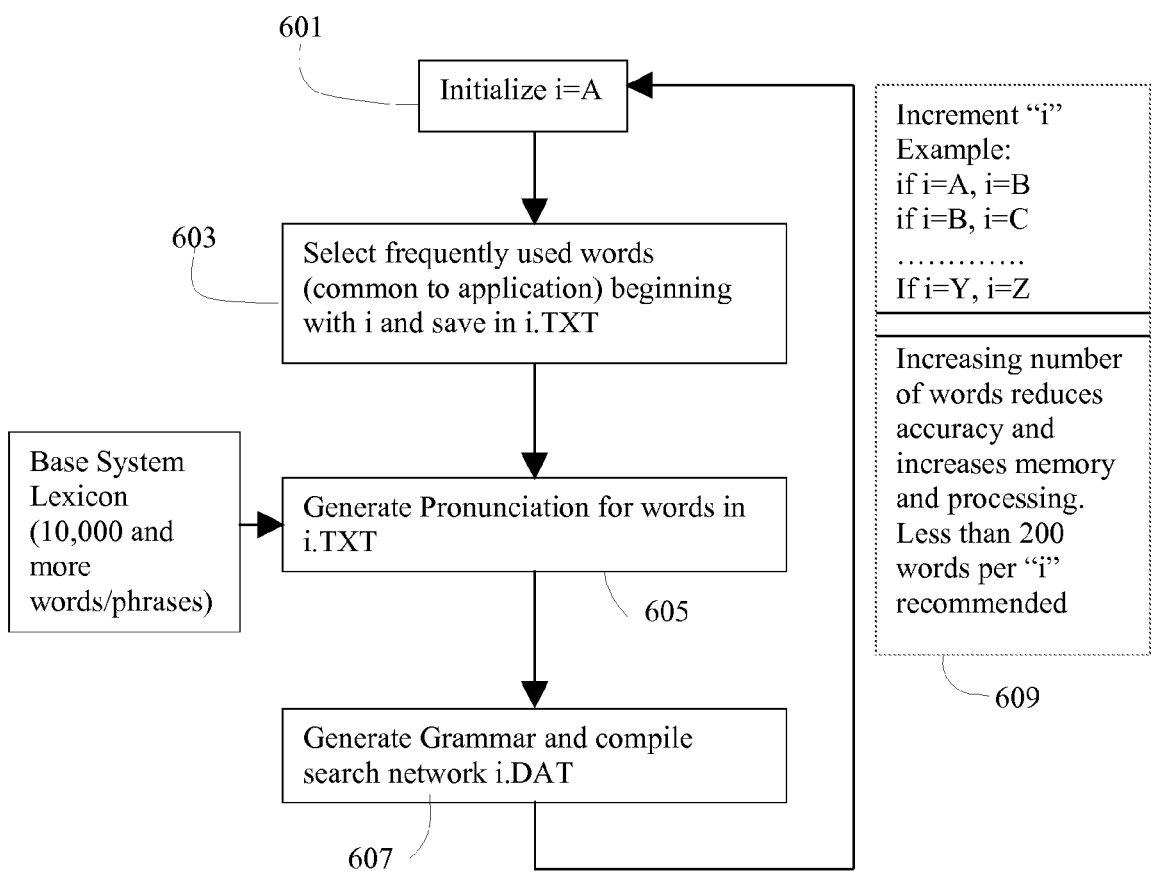
FIG. 6A illustrates a process for generating a Pre-Compiled Search Network.
Figure 6B:
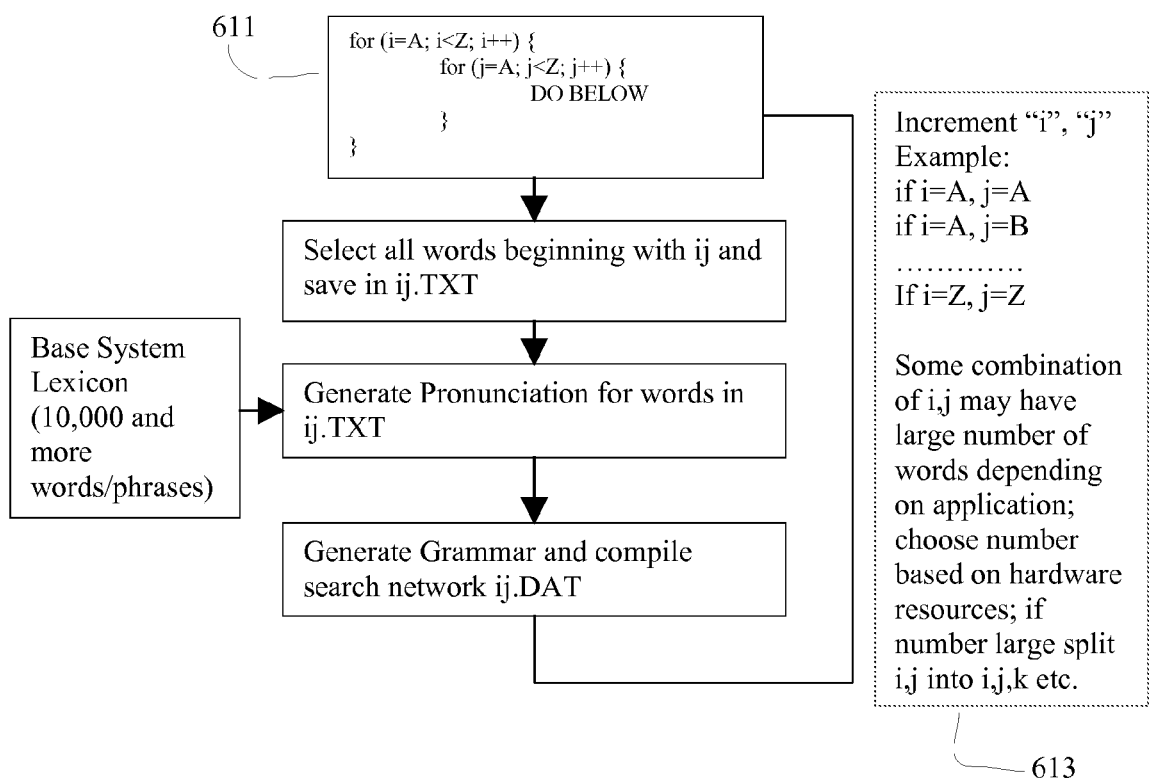
FIG. 6B illustrates an example of the process shown in FIG. 6A.

The process to build the pre-compiled search networks is illustrated in FIGS. 6A and 6B. FIG. 6A illustrates the case where a lexicon is being created based on a single letter being known, while FIG. 6B illustrates the case where a lexicon is being created based on a given combination of two (or more) characters. As shown in FIG. 6A, the process begins by initializing a variable "i" to some initial value, such as the letter "A" (block 601). Words from the base system lexicon that begin with the letter represented by "i" are added to a text file having a name of i.TXT, where the letter "i" represents the currently selected letter value (e.g., "A" currently) (block 603). Using a suitable pronunciation model (well-known in speech recognition field), pronunciations are generated for each of the words identified in "i.txt" (block 605). The system then generates grammar for the words in "i.txt" and compiles the result as a "pre-compiled search network" named, in this instance, i.dat, where again the "i" represents the currently selected letter. At this point, the variable "i" is incremented to the next possible value, e.g., the next letter in the alphabet sequence, and the process repeats (block 609). The process runs again and continues to repeat until a different pre-compiled search network has been created for every possible value of "i".

As shown in FIG. 6B, a similar process is performed except that more search networks are created based on two-letter strings. Accordingly, the process illustrated in FIG. 6B differs from the process in FIG. 6A in that two variables "i" and "j" are used (block 611), and those variables are individually incremented (block 613) until the possible combinations of search networks have been generated.

Observe that for the first set (FIG. 6A), the most common words are used based on what is commonly referred to as n-gram statistics in language modeling. This is because if the system vocabulary is 26,000 words there is all possibility that each list will on an average be 1000 words. Many devices do not have the processing power to search an active list of 1000 words. Even if they do, the confusion between words reduces the recognition accuracy. Experiments conducted by the inventors have revealed that 200 words is a good limit for many practical applications.

For the second set (FIG. 6B), combination of the $1^{st}$ and $2^{nd}$ characters are used to create the words. In this case, most of the combinations have words less than 200. If they are more than 200, once again n-gram counts may be used to select the top 200 words and the rest may be split into 3-character lists or other techniques may be incorporated. Obviously, the actual process may be run off-line (on a PC or other machine) and the final search-network files may be packaged into a single data-structure.

Several extensions to the above are possible. For instance, based on the frequency of usage of words by the user (also referred to as dynamic statistical language modeling) the words from 3-letter lists may be moved into 2-letter lists and subsequently to 1-letter lists and finally to a list that does not require any letter input, meaning pure speech-to-text; and vice-versa. For instance if the word "consequence" was included in the con.dat search network because its unigram count for English language is low and a user begins using the word "consequence", then "consequence" may be moved to co.dat and further up to c.dat and so on and finally be the word in the main recognition pass. Similarly if "although" is word in a.dat and not being used then it could be moved to al.dat and alt.dat and so on.

Several other extensions are possible for selecting words. For instance a combination of longer and more frequent words may be grouped together and using the so-called confusion matrix (well-known in speech recognition) the top 200 words may be selected.

Those skilled in speech recognition will appreciate that the disclosed embodiments, dubbed as "Predictive Speech-to- Text", may be generally studied under a new framework for multimodal speech recognition. For instance in traditional speech-to-text (commonly referred to as Dictation) systems the acoustic network is compiled on-the-fly as a user speaks. To limit computation, (a) a statistical language model is cached which essentially dictates the possible phoneme combinations within the acoustic network, (b) the maximum-likelihood probability is computed using a combination of acoustic scores (calculated using dynamic programming as in Viterbi Search) and the language model scores, and (c) only hypothesis falling within a so-called "Beam" are kept active in the dynamic acoustic network. One of several different modeling techniques including hidden markov modeling, artificial neural networks, hybrid networks, support vector machines etc are employed for acoustic modeling and search. This same methodology may be extended with the addition of multimodal inputs from a user. The multimodal inputs in the form of letters corresponding to the spelling of text may be viewed as an additional language model (in this case deterministic-ambiguous or deterministic-unambiguous) and the speech-to-text theoretical framework may be extended by incorporating this additional information of the spelling of the text.

A careful observation of the proposed invention further reveals that it is a universal framework for multimodal recognition which builds on top of existing well-known text prediction methodologies. So, if the speech waveform input to the proposed invention system is simply background noise (which would be the case if a user would simply type and not speak) then random noise will give rise to random prediction of text. In the absence of a language model, this could be theoretically viewed as standard text-prediction.

In FIGS. 7A-7C, details of methods for searching using pre-compiled searches are described. An example of recognizing the word "MEETING" is considered. In FIG. 7A, given the initial letters forming the spelling of the word (block 701), the associated search network file is selected (block 703). This may be done using a hash-table-lookup or any one of several available programming techniques. Additionally, although this look-up should be done at run-time, the actual initialization of the ASR engine may be done at the application launch and/or when the device (for instance a mobile device) boots up. Notice that as more letters forming the word's spelling are provided by the user, the better the accuracy of the system. However, instead of storing search networks for 3 or more spelling-letters, N-Best processing may be performed in these instances (block 705). For example instead of storing MEE.DAT or MEET.DAT, the alternative choice list (referred to as N-Best) output by using ME.DAT is post-processed (block 707). This is to reduce memory requirements.

Some specific examples of the search dictionary and the search network are shown in FIGS. 7B and 7C. FIG. 7B illustrates an example of a Search Dictionary for use in the process illustrated in FIG. 7A. FIG. 7C illustrates an example of a Search Word-Graph for the example Search Dictionary shown in FIG. 7B. In practice this is replaced by the phoneme-graph based on the pronunciation of the words. These are ways the ASR engine uses to form search-networks. Those skilled in the art will recognize that several variants of these may be employed, for instance a grammar network may be reduced based on root-pronunciations and/or root-endings, the word's spelling may be incorporated within the grammar (for increasing accuracy on short words), dynamic grammars may be used with additional scoring penalties based on letters inputted etc.

The procedures in FIGS. 7A-7C may be by-passed if one were to build the search network during run-time (as shown in FIG. 1). This may be achieved using standard ASR techniques.

In FIGS. 8A-8F, multiple recognition and processing and error-correction for the system illustrated in FIG. 1 are shown for Words, Commands, and Phrases. Other extensions will also become apparent, such as for word-spotting, and for applications including mobile search, audio-mining, etc.

Figure 8A:
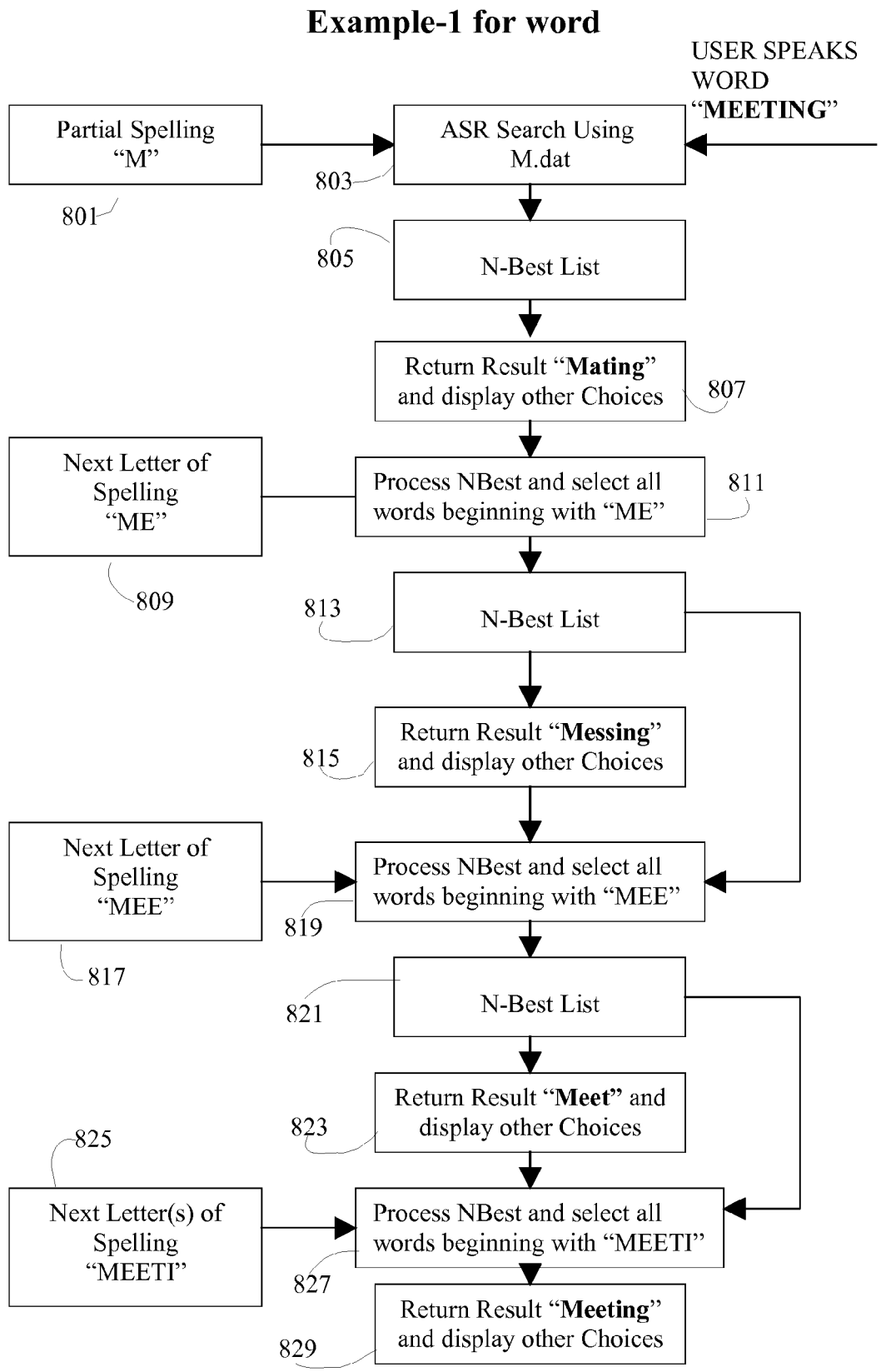
FIG. 8A illustrates an example produced with the system for Multiple-Recognition and Processing and Error-Correction for a word.

In FIG. 8A, the user speaks the word "meeting" in combination with typing the letter "M" on a keypad (block 801). The ASR engine begins performing a search using a reduced lexicon network based on words that begin with the letter "M" (block 803), thus creating an N-best list of likely candidate results (block 805). In this example, the first candidate result in the word "Mating", which is displayed together with other choices (block 807).

The user keys in another letter, "E", which is added to the previous input string to form "ME" (block 809). The N-best list is processed to identify words that begin with the letters "ME" (block 811), and a new N-best list is created (block 813). The user's choices are updated to reflect a new best choice of "messing", together with other choices (block 815).

The user keys in yet another letter, "E" again, which is added to the existing string to form "MEE" (block 817). The current N-best list is processed to identify only words that begin with the string "MEE" (block 819), and a new N-best list is created (block 821). The user's current choices, including best guess of "Meet", is displayed (block 823).

The user keys in still more letters, "T" and "I", which is added to the existing string to form "MEETI" (block 825). The current N-best list is processed to identify only words that begin with the string "MEETI" (block 827). At this point, there may only be a single word on the N-best list, and accordingly the user's only choice of "Meeting" is displayed (block 829).

Figure 8B:
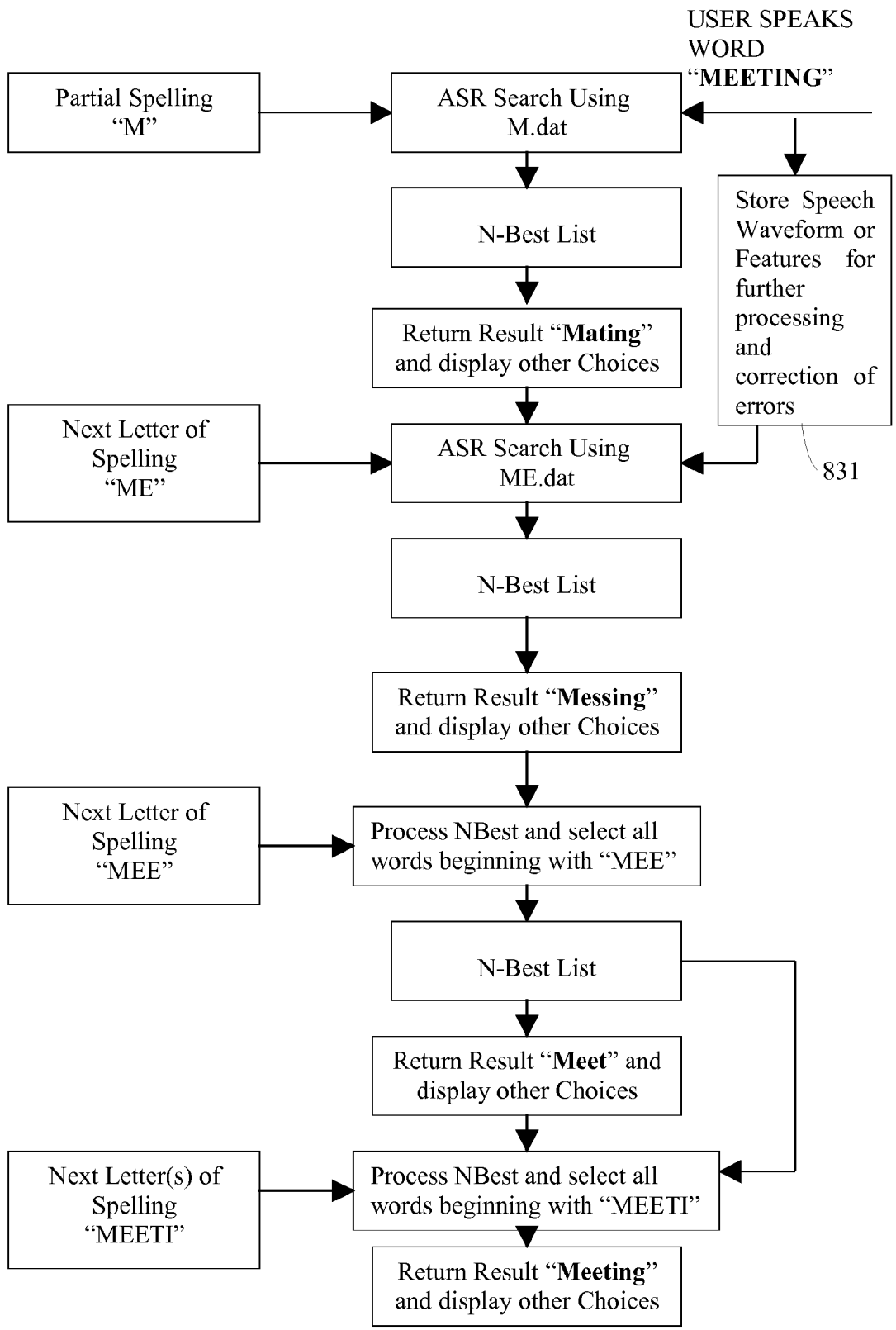
FIG. 8B illustrates another example produced with the system for Multiple-Recognition and Processing and Error-Correction for a word.

FIG. 8B illustrates a similar example as illustrated in FIG. 8A, except that in this example, the user's original utterance is stored by the ASR engine for further processing and correction of errors. In this way, instead of relying on NBest processing, the reduced lexicon networks are employed for successive iterations, till no more precompiled networks exist, at which point the system resprts to NBest processing as in FIG. 8A. Note that the system can learn over time and improve its accuracy.

FIG. 8C illustrates two examples of performing a "voice-dialing" operation using embodiments. In one example, the user speaks "John Smith" in a voice dial mode, and the ASR engine begins performing a search of the names that could match that utterance (block 833). The ASR engine builds an N-best list based on its search (block 835). Based on the N-best list, the system displays the most likely choice of "Jone Adams" together with other choices (block 837). The user begins to input, using the keypad, the letters of the desired name starting with the letter "J", which indicates that "Jone Adams" is not the correct selection (block 839). In this example, the ASR engine processes the N-best list to eliminate names that do not begin with the letter "J". As the user had not previously entered any text, the ASR engine did not have a reduced lexicon to search and the accuracy of the initial results may have been poor, especially if the user's contacts list is long. However, after the user begins entering text, the N-best list can be searched to identify other choices that begin with the letter "J".

As shown in the second example, the user may also begin entering text manually (block 845) while also speaking the name "John Smith". In this way, the base system lexicon can be reduced to only those names that begin with the letter "J" (block 847), thus improving the initial recognition accuracy and speed of the system. Although in this example, the user still must key two letters (block 849), in other examples the improved name recognition accuracy will reduce the number of incorrect recognitions.

Figure 8D:
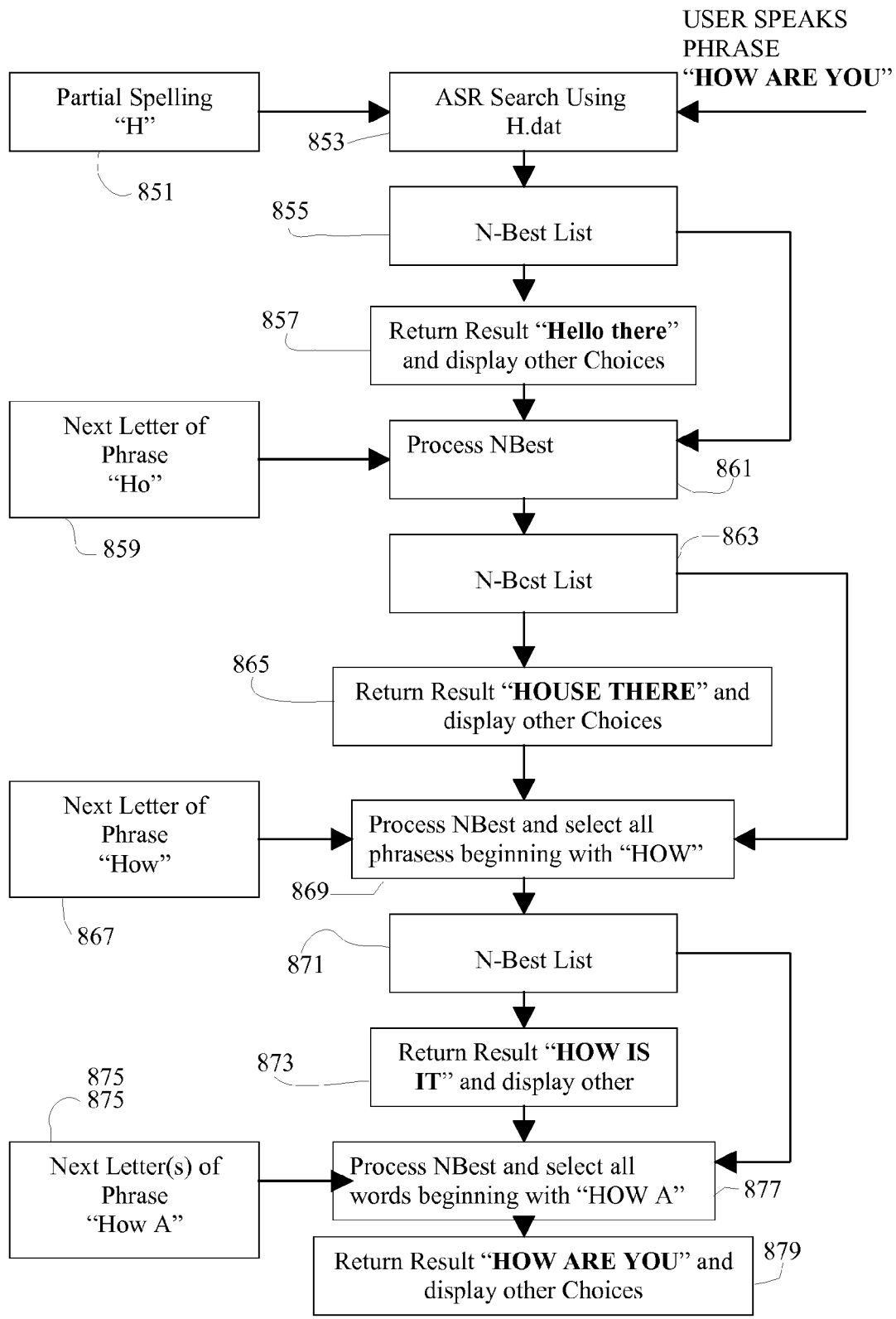
FIG. 8D illustrates an example produced with the system for Multiple-Recognition and Processing and Error-Correction for a phrase.

FIG. 8D illustrates an example of recognizing a spoken phrase. In this example, the user speaks the phrase "how are you" and also begins to key in the phrase (block 851) beginning with the letter "H". Based on the keyed input, the system activates a pre-compiled reduced lexicon for words or phrases that begin with the letter "H" (block 853). The ASR engine creates an N-best list (block 855) based on that lexicon, and displays the initial best guess (block 857) with other choices. The user keys in the next letter of the phrase "O" (block 859), and the ASR engine processes the N-best list to eliminate any entries that do not begin with the string "HO" (block 861). A new N-best list is created (block 863), and the new best guess and other choices are displayed (block 865). These operations repeat (blocks 867-873) until the user keys the letter "A" of the phrase (block 875), at which point the ASR engine identifies the accurate phrase (blocks 877-879).

Figure 8E:
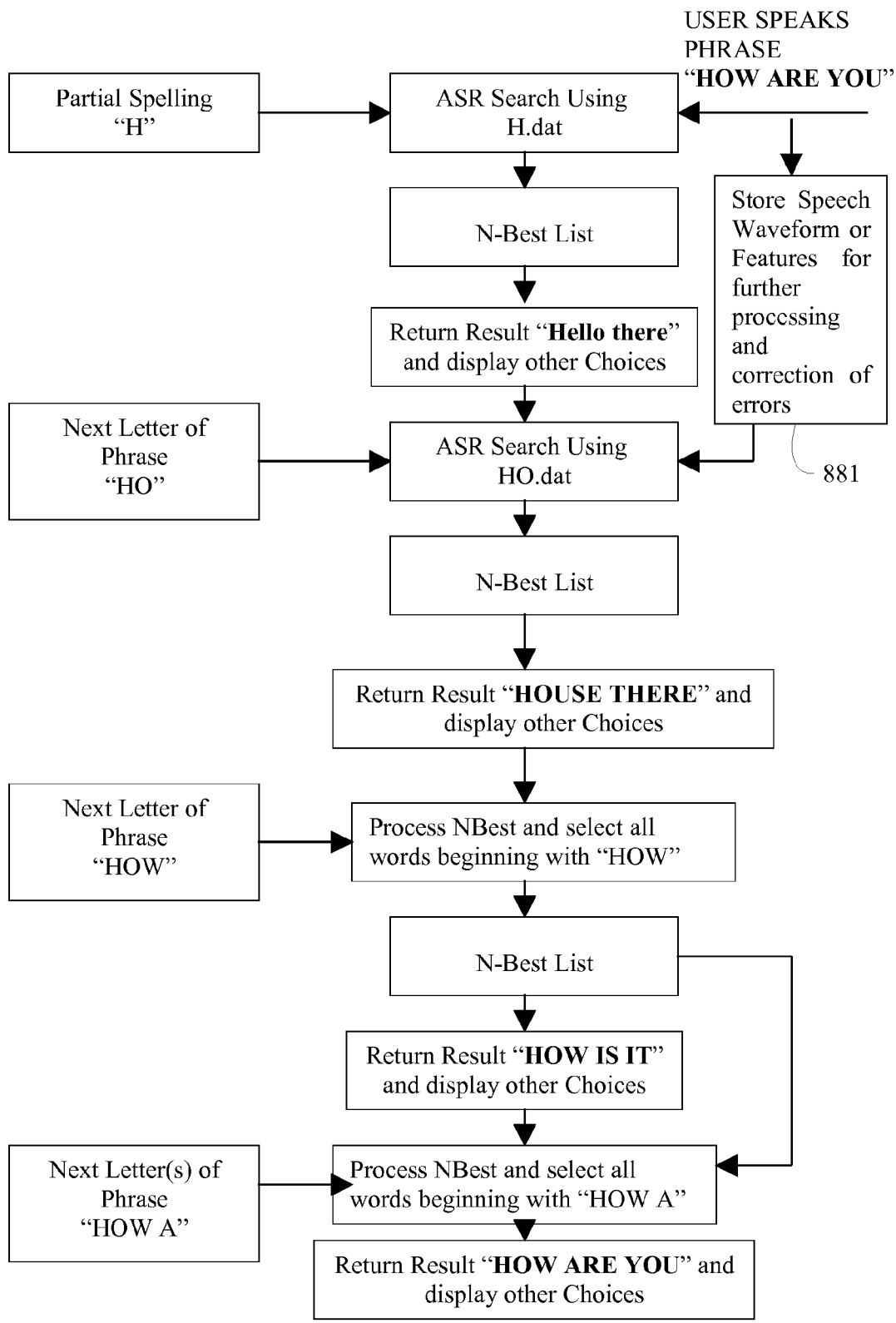
FIG. 8E illustrates another example produced with the system for Multiple-Recognition and Processing and Error-Correction for a phrase.

FIG. 8E illustrates another example that is similar to the example illustrated in FIG. 8D, with the exception that the user's spoken utterance is stored for further processing and correction of errors (block 881). In this way, the system can improve its recognition accuracy and speed especially when handling large number of phrases.

Figure 8F:
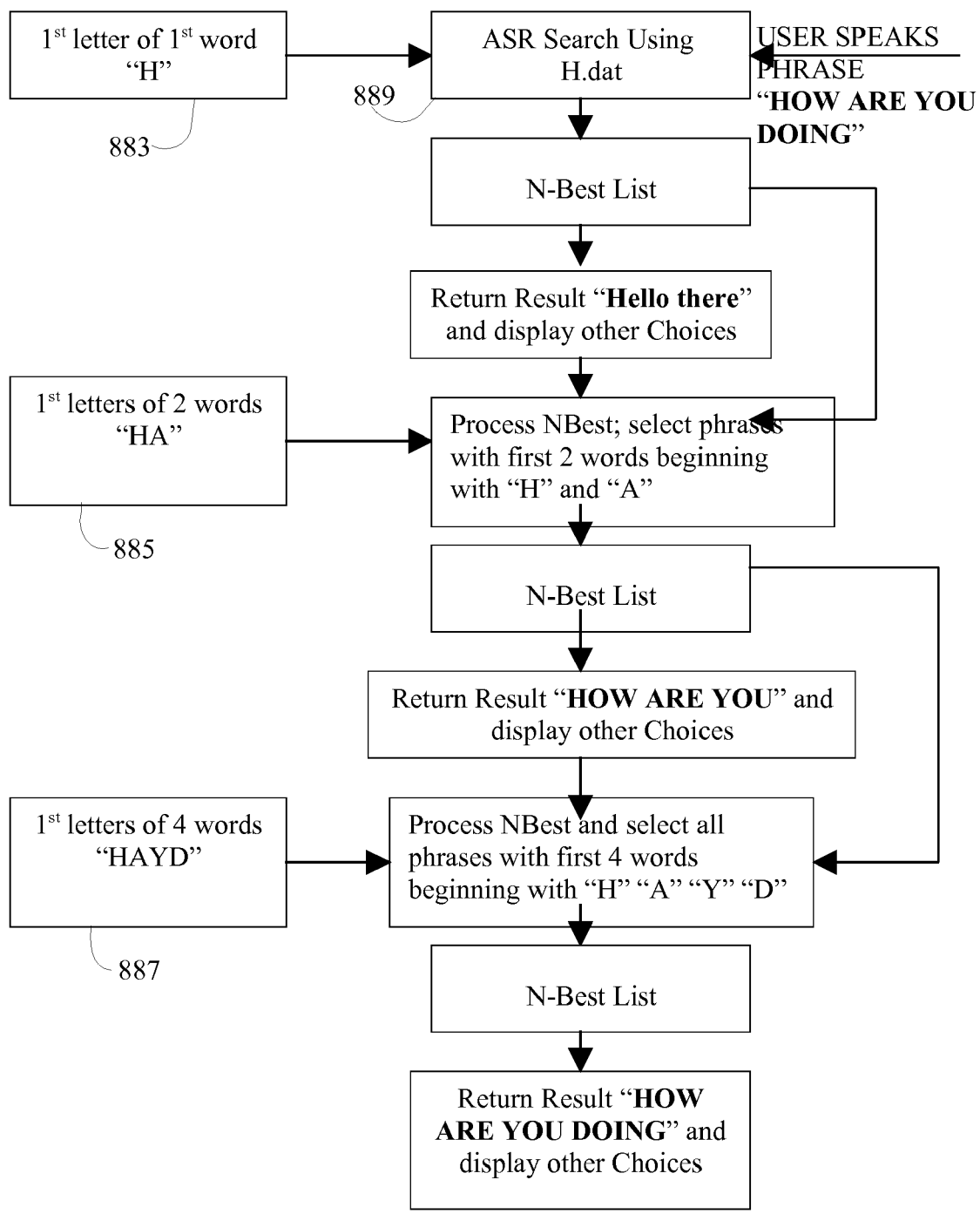
FIG. 8F illustrates another example produced with the system for Multiple-Recognition and Processing and Error-Correction for a phrase.

FIG. 8F illustrates yet another example similar to the example illustrated in FIG. 8D, with the exception that instead of serially keying in the letters of the phrase to be recognized from first to last, this example performs recognition by attempting to identify a phrase when the user keys in only the first letter of each word of the phrase. In other words, the user speaks the phrase "How Are You Doing", and also begins keying the letters "H" (block 883), "A" (block 885), "Y" and "D" (block 887), which correspond to the first letters of each word in the phrase. In this way, the system first activates the reduced lexicon associated with only phrases that begin with the letter "H" (block 889), and then improve the list of choices by eliminating phrases that do not include words with the appropriate initial letters. This technique greatly improves the ability to quickly recognize whole phrases.

In FIGS. 9A-9D, a process is described that addresses new text addition. This can be especially useful when the system shown in FIG. 1 is not able to recognize/predict text. The text may not be recognizable primarily because the text (example Word) is either not in the system's overall lexicon (this may occur frequently for proper names, short forms, unknown phrases etc) or for some reason the pronunciation of that text (as stored in the ASR system lexicon) is inaccurate.

Figure 9A:
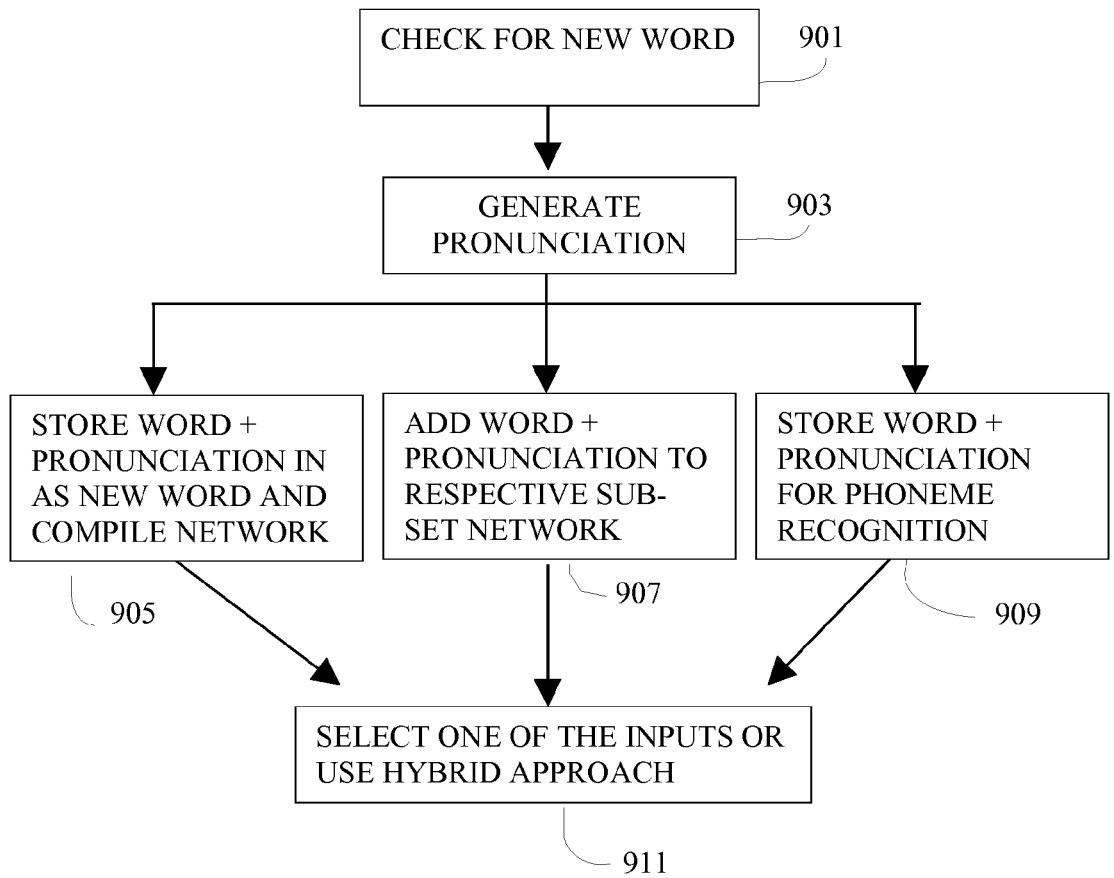
FIG. 9A illustrates a process for Adding New Words.

A method for creating a dynamic database for new words is shown in FIG. 9A. Specifically, a new word may be tracked when the user initiates a new-word command (using manual key or voice-command) or when user enters a space (the # key in some cellular devices) or any such input. One could additionally check against the system lexicon for pre-existence of the word or could check the current NBest list for existence of the word and/or one may simply treat it as a new word (block 901). Once the system records a new word, a database (for instance an ASCII/binary file) may be updated with this word along with its pronunciation (which may be extracted using any standard ASR system pronunciation-generator-module) (block 903).

A system may update the existing system lexicon or sub-set lexicon or their respective grammar networks (block 907); or create a separate data-structure for the new words (block 905). Recall that adding a new word to the existing lexicon could be achieved using standard ASR system programming interface calls. However, this may not be practically realizable given the memory and processing speed constraints of the devices. Hence, FIG. 9A also describes another method based on creating a second data-structure. This may be done by storing all new user-added words into a single data-structure (for instance new-word.dat) and/or by storing them into multiple sub-set data-structures (similar to the sub-set lexicons created in FIG. 1). The later may be done, for example, by associating a different file name as in ME_New.dat as opposed to ME.dat or by setting a flag in a single data structure. Having created an entry for this new-word, when the user tries to predict this same word next time (by Speaking) then the system is able to do so.

Figure 9B:
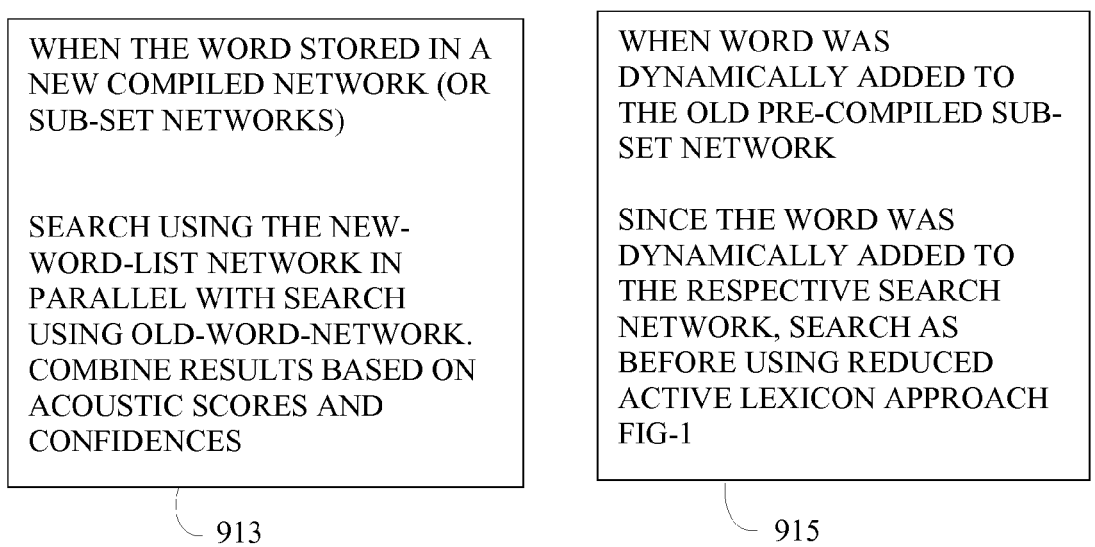
FIG. 9B illustrates a process for Searching with New Words using word recognition.

One process for addressing this is illustrated in FIG. 9B. In this example, if the new word was added to a new data-structure, then the ASR engine may search both the existing search networks in parallel with the new word search network (block 913). In contrast, if the new word was added to the existing data structures, then the ASR engine would simply search the same search networks as before (block 915).

Figure 9C:
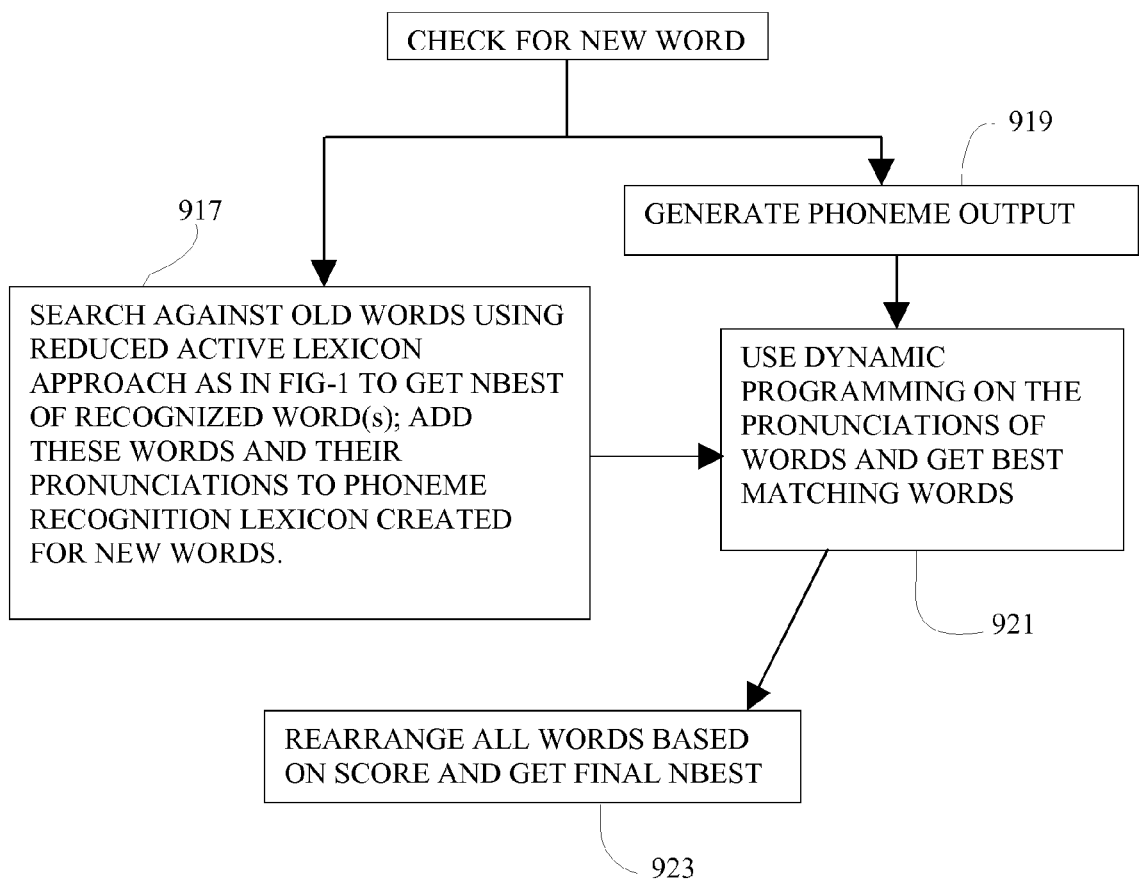
FIG. 9C illustrates a process for Searching with New Words using phoneme recognition.

Another embodiment is illustrated in FIG. 9C which uses a hybrid approach of word and phoneme recognition. Observe that, along with the traditional ASR search (block 917), phoneme recognition is performed in parallel (or in subsequence) using standard phoneme-recognition techniques (block 919). The best word resulting from the former is also included in the phoneme recognition. Dynamic Programming techniques (standard in ASR systems) are then employed to simply do a phoneme-string comparison (block 921). The best matching hypothesis are then ordered in a new N-best which is subsequently passed to the user-interface (block 923).

As an example if the new word is "MENALICO" then the best scoring word by recognizing using ME.dat, and its pronunciation is first added to ME_NEW.dat; next dynamic-programming is used for scoring the phoneme string recognized when user said MENALICO against all the phoneme strings in ME_NEW.dat. The words associated with the best scoring candidates are then returned to user-interface.

Those skilled in the art will appreciate that the method described above, to add new words, may be simply used in place of pre-compiling sub-set lexicons corresponding to a large base lexicon. For example, in mobile devices that lack memory, one could envision having no base lexicon and as the users begin to enter text using the keypad or other modes, the sub-set networks corresponding to the words being used get dynamically created.

Figure 9D:
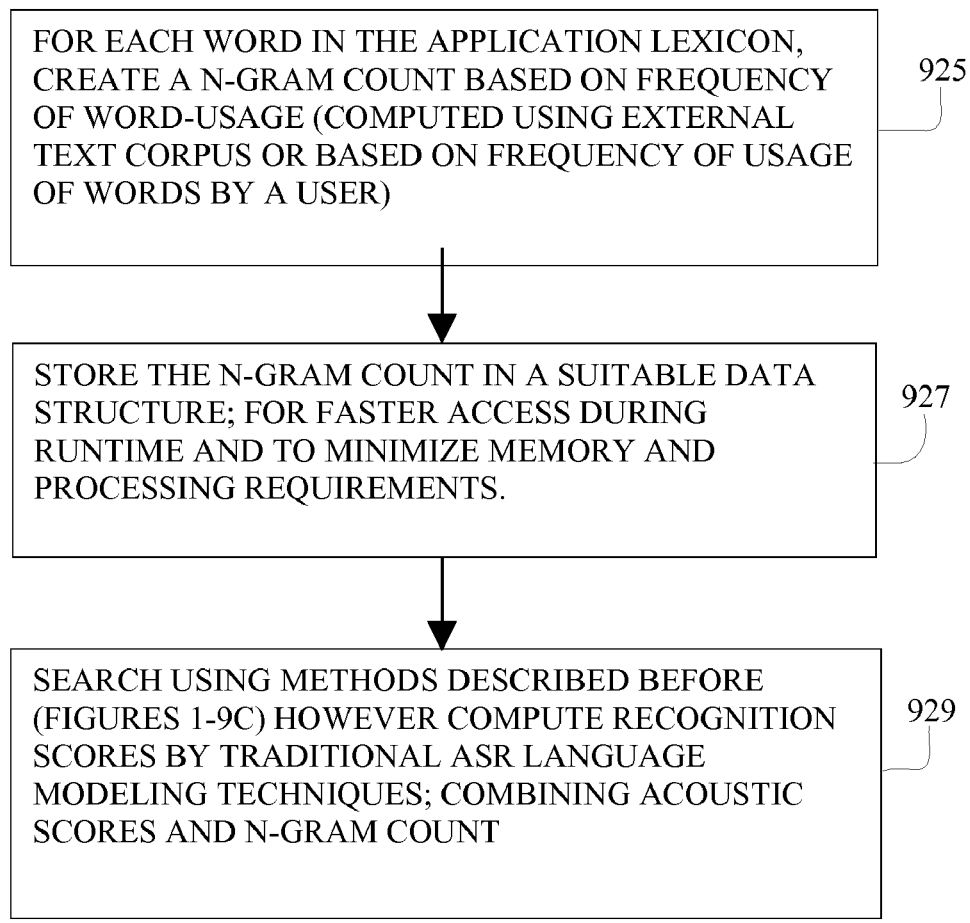
FIG. 9D illustrates a process for Searching using Statistical Language Model.

FIG. 9D illustrates a process for searching using a statistical language model. As illustrated in this process, for each word in the application lexicon, an n-gram count is created based on frequency of word-usage (computed using external text corpus or based on frequency of usage of words by a user) (block 925). The n-gram count is stored in a suitable data structure for faster access during runtime and to minimize memory and processing requirements (block 927). In addition, the methods described above (e.g., FIGS. 1-9D) may be used to search for text. However, recognition scores are computed using ASR language modeling techniques, combining acoustic scores and n-gram count (block 929).

Finally, several examples of real-world implementations are shown in FIGS. 10-15 and described here. Recall that in standard predictive text input systems, a user enters letters until the desired word is predicted and displayed by the system. Many variants of user-interface exist for correcting errors (left-arrow key, delete button, moving cursor to the location etc), displaying alternative choices (pop-up menu window, choice window at bottom, bubble windows etc). These embodiments may be implemented with a similar user-interface (illustrated in FIGS. 10-15), except that speech is additionally employed to enable the system to predict with fewer letters thereby reducing the number of key-presses.

Figure 10:
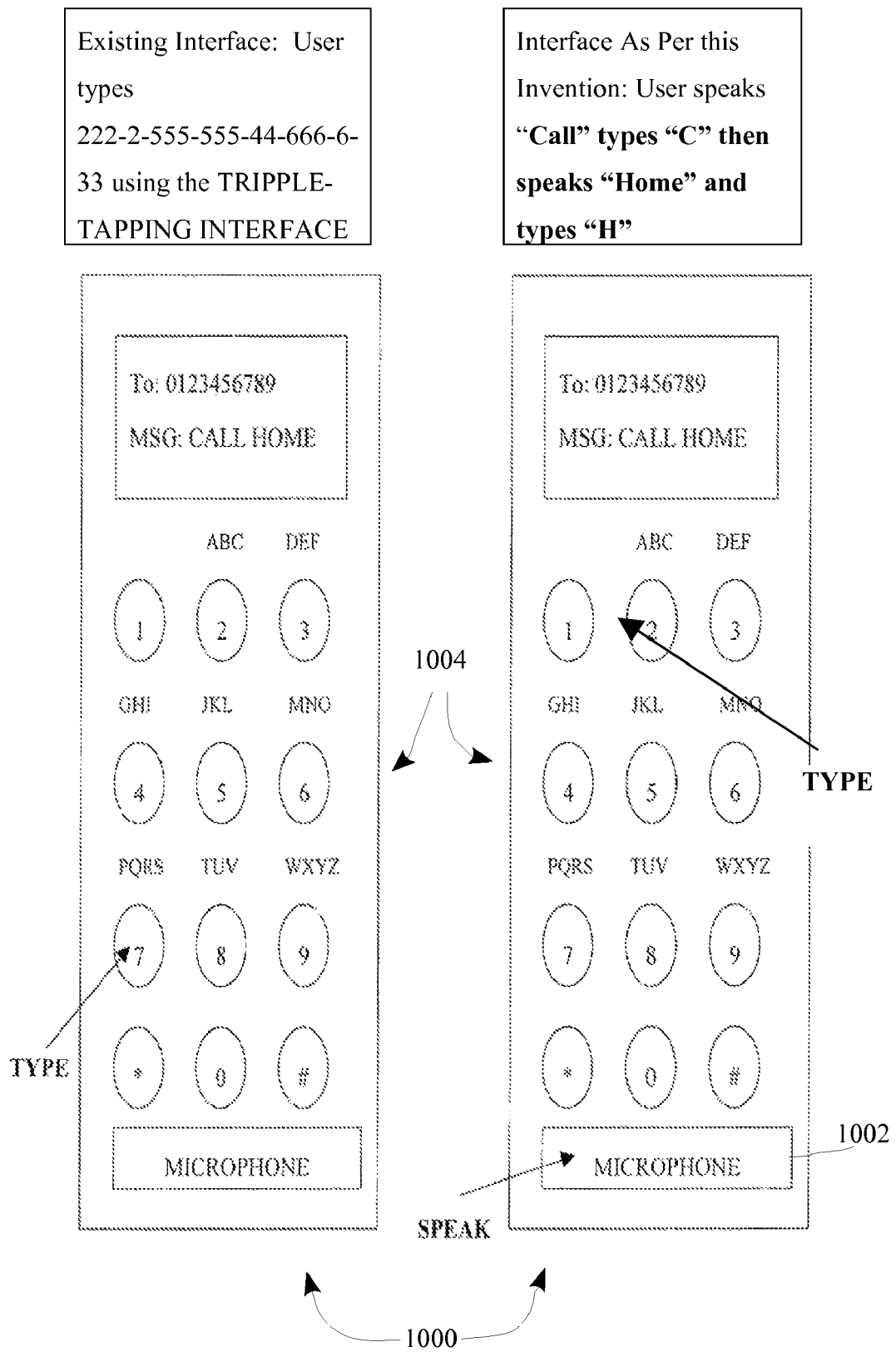
FIG. 10 illustrates one example of "text-messaging" that uses a hands-free interface.

FIG. 10 illustrates two examples of entering text on a mobile phone 1000, such as an ordinary cellular telephone. The mobile phone 1000 is configured with an implementation of the predictive speech-to-text systems described at length above. In addition, the mobile phone 1000 is configured to accept text input using the ordinary "triple-tap" method, wherein a button is keyed a number of times equal to the position of the desired letter in a three-letter sequence. The mobile phone 1000 also includes a microphone 1002 for audible input.

In this example, a user desires to input the phrase "call home". Accordingly, using the conventional triple-tap method (illustration on the left), the user would enter every letter of the text using the keypad 1004. In this example, the user would type the following button combination 222 ("C"), 2 ("A"), 555("L"), 555("L"), 44("H"), 666("O"), 6("M"), and 33("E"). The user may likely have to wait a brief pause between each letter for the mobile phone 1000 to recognize a letter. This method is very common, but requires a significant amount of time.

In contrast, the user could also speak the word "call" into the microphone 1002, and begin typing (either using triple-tap or not) the first letters of the word. The mobile phone 1000 then applies speech-recognition techniques to identify the spoken word "call", knowing that the first letter of the word is "C". Accordingly, accuracy is very high. The user would then speak the next word "home" and type the first letter(s) of that word. Alternatively, the user could speak the entire phrase "call home" and begin entering either the first letters of the first word, or the first letters of each word in the phrase.

Figure 11:
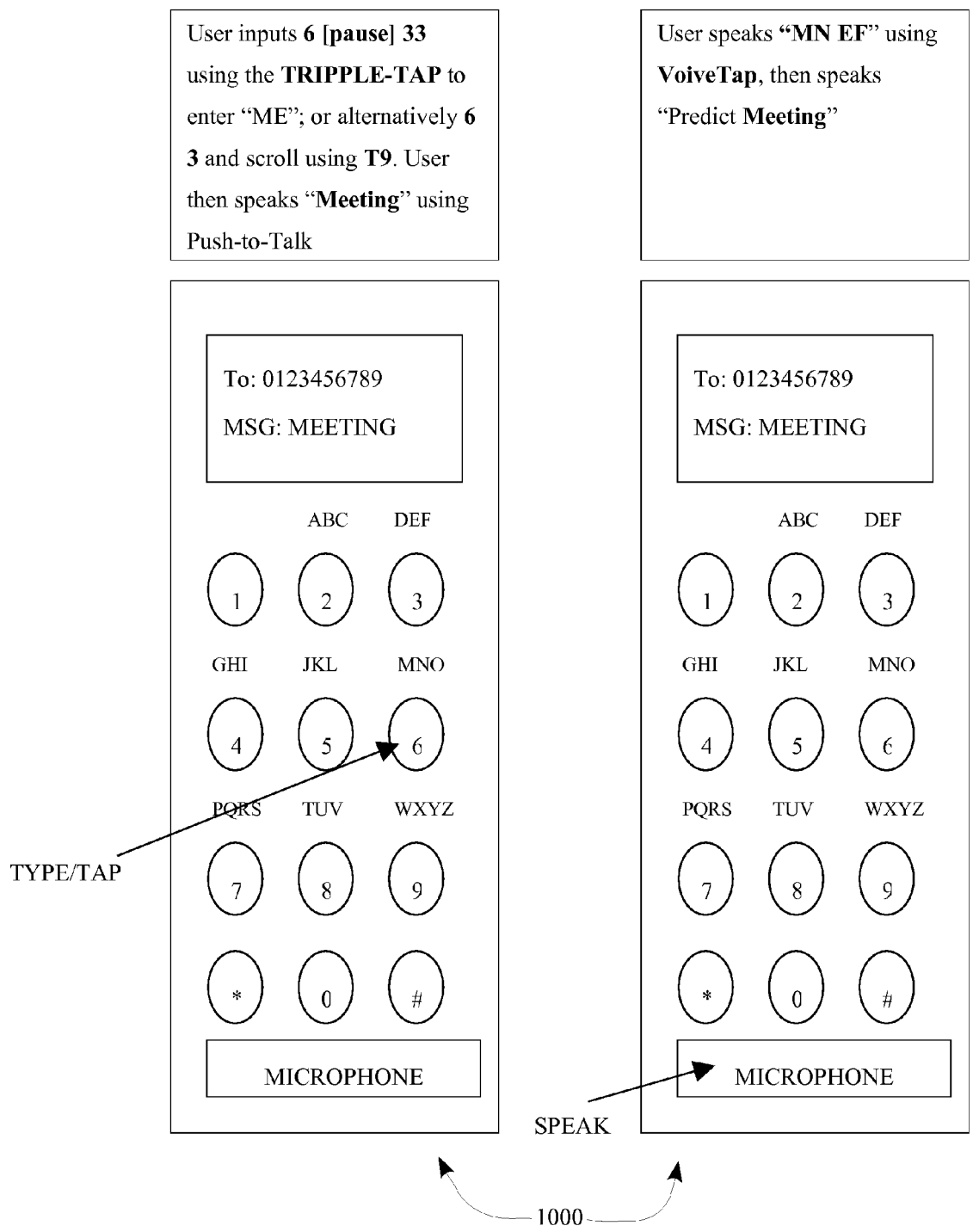
FIG. 11 illustrates an example of inputting partial spellings for the system illustrated in FIG. 1.

FIG. 11 illustrates another example in which the user desires to input the word "meeting". In the illustration on the left, the user could key in the letters "M" and "E" using the tripple-tap method, or some other predictive text input method, and then speak the work "meeting" using a push-to-talk control command, such as a special button on the phone 1000. In the example on the right, the user could speak the letters "MN EF" using voice-tap (which refers to an earlier invention by the inventors), and then speak the phrase "predict meeting", where the first word "predict" is a control command to indicate that the phone should attempt to predict the word "meeting".

Figure 12:
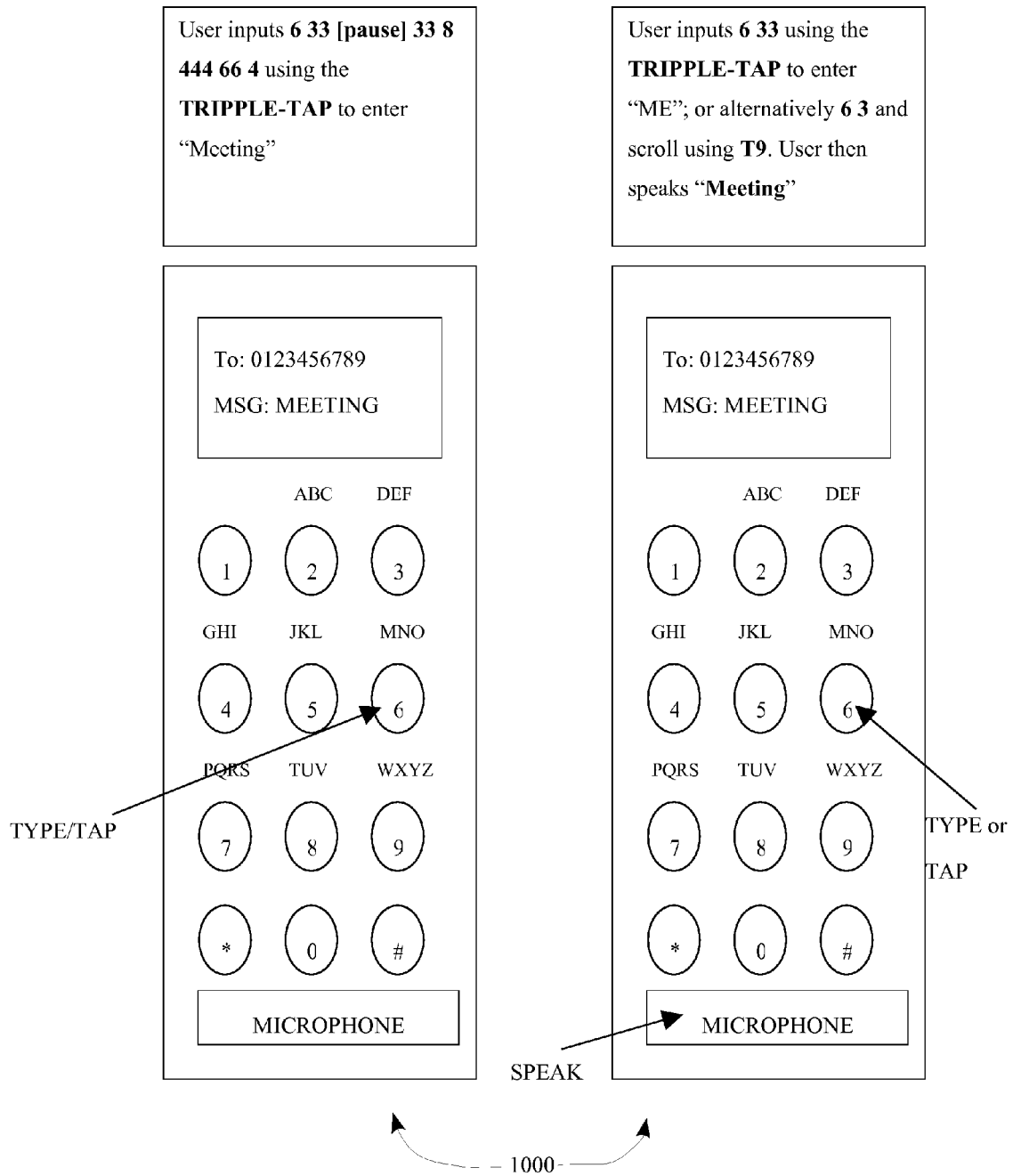
FIG. 12 illustrates an example of "text-messaging" using a multimodal interface.

FIG. 12 illustrates another example where the user desires to enter the word "meeting". As with the first example in FIG. 10, the user could simply triple-tap the entire word by entering the key combination 6-33-[pause]-33-8-444-66-4 to spell the word unambiguously. Alternatively, the user could triple-tap the letters "M" and "E" (key combination 6-33) and then speak the word "meeting".

FIG. 13 illustrates another example where the user desires to identify a particular song to play, a Britney Spears song. The mobile phone 1000 may be in a user mode that is prompting the user to identify a song from a library of songs on the mobile phone 1000. Those songs could, in this example, be indexed by artist. In the example on the left, the user could triple-tap 22-777-444 (B-R-I), which may be sufficient to identify the only song in the library by an artist whose name begins with the letters B-R-I. In the example on the right, the user may speak the name "Britney Spears" and the song title "Oops I did it again", and type in the first letter of the target phrase (key combination 22). Using only that information, the mobile phone 1000 could identify the correct song.

The examples illustrated in FIGS. 14A-14E illustrate the use of the above-described systems to send an SMS message to a recipient using an interface on the mobile phone. FIG. 14A illustrates what the interface could look like when the software application is turned on or launched. At this point, the user could begin speaking into the "TO" window or type a mobile number or insert a contact name using the menu soft-key.

As shown in FIG. 14B, if the user speaks "Greg Simon", an N-best choice list is displayed. The user could next press the "CALL" button or speak "begin voicedial" to place a call to Greg Simon. Alternatively, the user would press the down-arrow-key or say "begin message" to go to a message window. The user could also select "Aaron Smothers" from the N-best list by simply selecting choice 2 using the right-arrow-key or by saying "Select Choice 2". Alternatively, user could have typed in "G" in the "To" window and said "Greg Simon" . . . other variations may be envisioned.

As shown in FIG. 14C, the user speaks "what can i say" or presses the "menu" softkey and the "help" softkey to get a help window. One example of such a help window for hands-free mode is displayed in FIG. 14C. As shown in FIG. 14E, the user types "a"; says "am"; types "d"; says "driving"; says "period". The resulting output from the system is displayed as "am driving." FIG. 14-E is one example of a custom settings dialog that could be presented if the user enters a settings tab in menu.

Figure 15A:
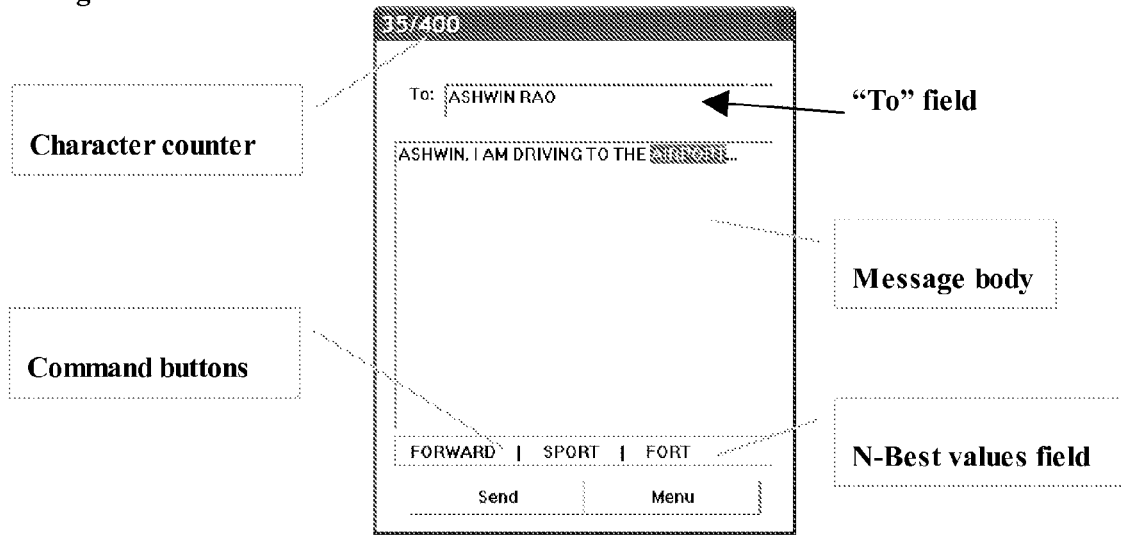
FIG. 15A illustrates an example of a user-interface used for SMS Dictation implementing one embodiment.
Figure 15B:
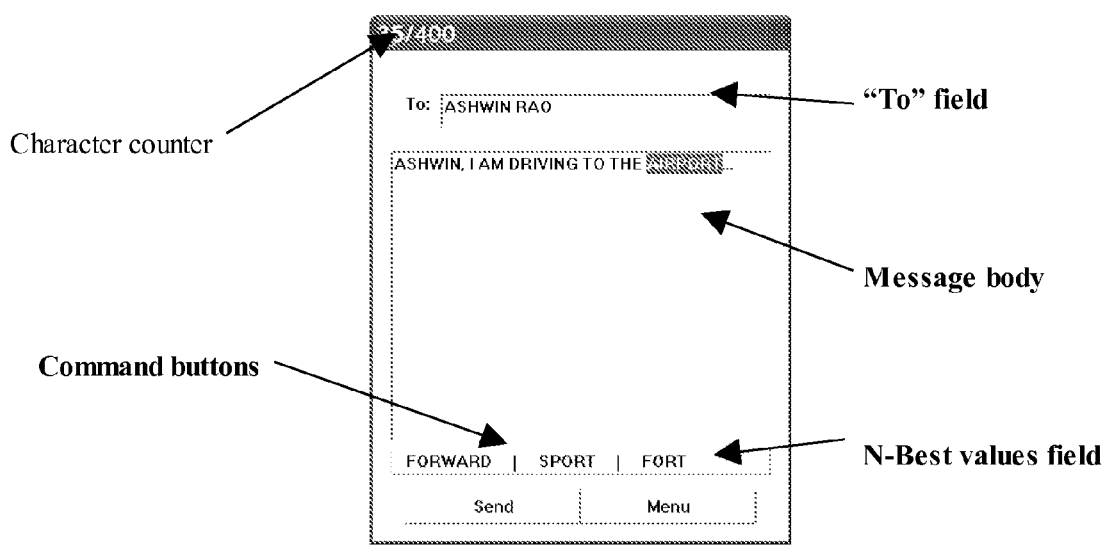
FIG. 15B illustrates another example of a user-interface for SMS Dictation implementing one embodiment.

FIGS. 15A and 15B illustrate yet another example of text input using the predictive speech-to-text systems described above. To achieve the text input displayed in FIG. 15A, the user could perform the following steps:

1. SPEAKS: ASHWIN RAO
 2. PRESSES: DOWN ARROW KEY TO GO TO MESSAGE WINDOW
 3. TYPES: A
 4. SPEAKS: ASHWIN
 5. SPEAKS: PERIOD
 6. TYPES: I
 7. SPEAKS: SPACE
 8. SPEAKS: AM DRIVING
 9. TYPES: A
 10. TYPES: TO [SPACE] THE
 11. TYPES: AI
 12. SPEAKS: AIRPORT
 13. HITS BUTTON TO SEND MESSAGE

Alternatively, to achieve the text input displayed in FIG. 15B, the user could speak the following phrases into an equipped mobile phone (or other device):

1. INSERT ASHWIN RAO
 2. BEGIN MESSAGE
 3. ABC PREDICT ASHWIN
 4. INSERT PERIOD
 5. IJK NEW-WORD
 6. ABC PREDICT-THAT AM DRIVING TO
 7. TYPES 84433 TO ENTER THE (note this step is typed, not spoken)
 8. ABC PREDICT-THAT AIRPORT
 9. SEND MESSAGE Other user interface variations may be achieved based on the invention. For instance to achieve the text input displayed in FIG. 15B, the user could speak the following phrases into an equipped mobile phone (or other device):

1. INSERT ASHWIN RAO
 2. BEGIN MESSAGE
 3. ASHWIN A

4. INSERT PERIOD
5. IJK NEW-WORD
6. AM DRIVING TO A M
7. TYPES 84433 TO ENTER THE (note this step is typed, not spoken)
8. A I R AIRPORT
9. SEND MESSAGE This invention has broad applications. It may be used in any application that requires text entry on any hardware and/or software including personal computers, mobile devices, embedded system and other computing machines. Using this invention, users may input the partial spelling of a text and simply speak that text to input that text into any desired application. Some well-known applications include text messaging, music download and/or playback on devices, mobile or automobile navigation, mobile internet search, calendar entry, contact entry etc.

Those skilled in art will easily appreciate that a plurality of variants of the invention may be plausible. Further extensions of the system to include, word-spotting of phrases, statistical language modeling (unigram, bigram, n-gram etc, context models, topic models etc.), language translation, different application extensions may all be easily envisioned.

Certain of the components described above may be implemented using general computing devices or mobile computing devices. To avoid confusion, the following discussion provides an overview of one implementation of such a general computing device that may be used to embody one or more components of the system described above.

Figure 16:
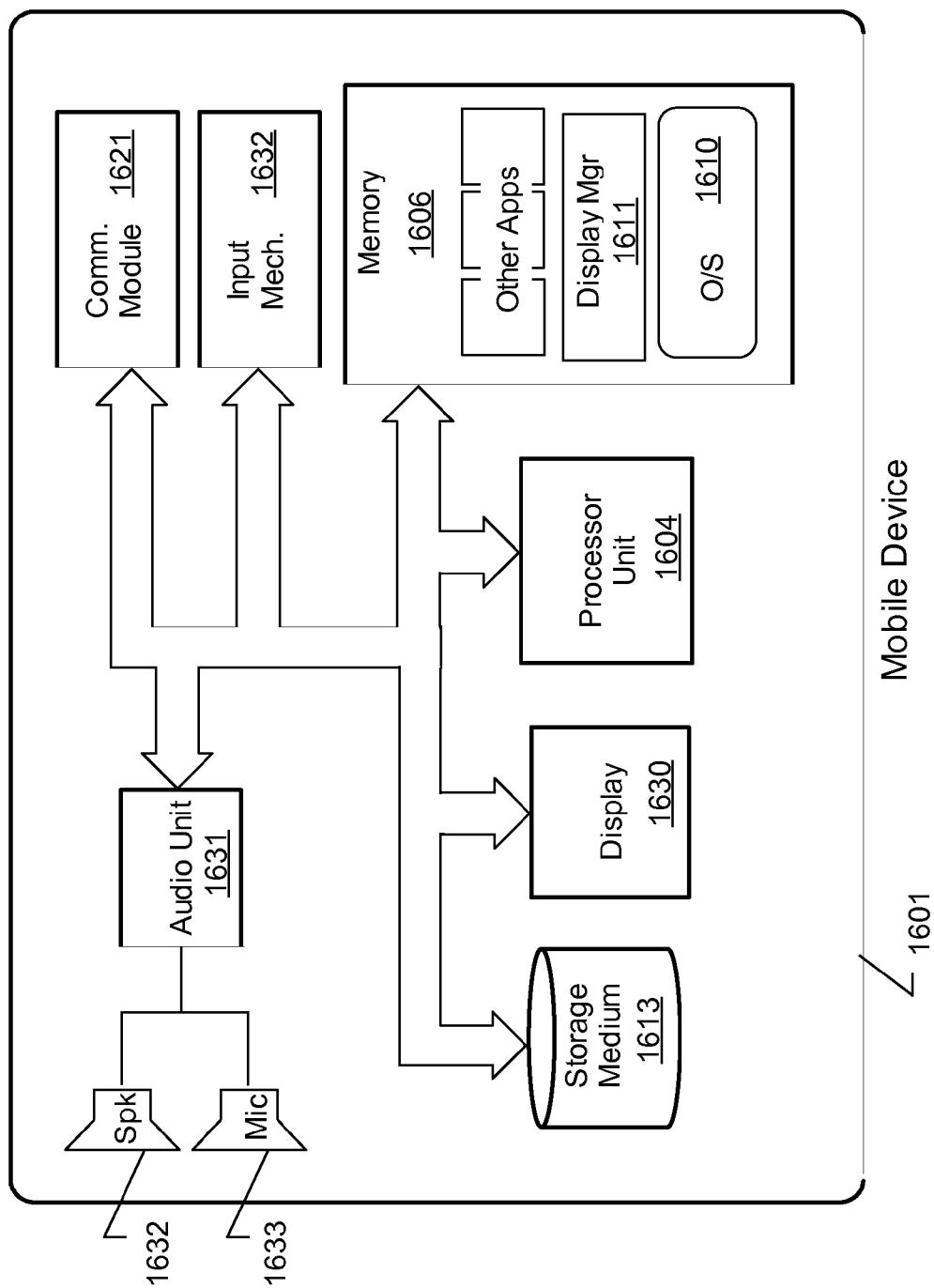
FIG. 16 is a block diagram representing a computing device in the form of a general purpose computer system with which embodiments of the present invention may be implemented.

FIG. 16 is a functional block diagram of a sample mobile device 1601 that may be configured for use in certain implementations of the disclosed embodiments or other embodiments. The mobile device 1601 may be any handheld computing device and not just a cellular phone. For instance, the mobile device 1601 could also be a mobile messaging device, a personal digital assistant, a portable music player, a global positioning satellite (GPS) device, or the like. Although described here in the context of a handheld mobile phone, it should be appreciated that implementations of the invention could have equal applicability in other areas, such as conventional wired telephone systems and the like.

In this example, the mobile device 1601 includes a processor unit 1604, a memory 1606, a storage medium 1613, an audio unit 1631, an input mechanism 1632, and a display 1630. The processor unit 1604 advantageously includes a microprocessor or a special-purpose processor such as a digital signal processor (DSP), but may in the alternative be any conventional form of processor, controller, microcontroller, state machine, or the like.

The processor unit 1604 is coupled to the memory 1606, which is advantageously implemented as RAM memory holding software instructions that are executed by the processor unit 1604. In this embodiment, the software instructions stored in the memory 1606 include a display manager 1611, a runtime environment or operating system 1610, and one or more other applications 1612. The memory 1606 may be on-board RAM, or the processor unit 1604 and the memory 1606 could collectively reside in an ASIC. In an alternate embodiment, the memory 1606 could be composed of firmware or flash memory.

The storage medium 1613 may be implemented as any nonvolatile memory, such as ROM memory, flash memory, or a magnetic disk drive, just to name a few. The storage medium 1613 could also be implemented as a combination of those or other technologies, such as a magnetic disk drive with cache (RAM) memory, or the like. In this particular embodiment, the storage medium 1613 is used to store data during periods when the mobile device 1601 is powered off or without power. The storage medium 1613 could be used to store contact information, images, call announcements such as ringtones, and the like.

The mobile device 1601 also includes a communications module 1621 that enables bi-directional communication between the mobile device 1601 and one or more other computing devices. The communications module 1621 may include components to enable RF or other wireless communications, such as a cellular telephone network, Bluetooth connection, wireless local area network, or perhaps a wireless wide area network. Alternatively, the communications module 1621 may include components to enable land line or hard wired network communications, such as an Ethernet connection, RJ-11 connection, universal serial bus connection, IEEE 1394 (Firewire) connection, or the like. These are intended as non-exhaustive lists and many other alternatives are possible.

The audio unit 1631 is a component of the mobile device 1601 that is configured to convert signals between analog and digital format. The audio unit 1631 is used by the mobile device 1601 to output sound using a speaker 1632 and to receive input signals from a microphone 1633. The speaker 1632 could also be used to announce incoming calls.

A display 1630 is used to output data or information in a graphical form. The display could be any form of display technology, such as LCD, LED, OLED, or the like. The input mechanism 1632 may be any keypad-style input mechanism. Alternatively, the input mechanism 1632 could be incorporated with the display 1630, such as the case with a touch-sensitive display device. Other alternatives too numerous to mention are also possible.

The invention claimed is:

1. A method of multi-modal text prediction, comprising:
   (a) receiving a speech waveform corresponding to text to be recognized;
   (b) receiving at least one letter corresponding to a portion of the text, the at least one letter being received from an unambiguous data source;
   (c) dynamically determining a search network based on the at least one letter, the search network including units of sound based on the at least one letter;
   (d) applying speech recognition techniques that pattern-match the speech waveform against the search network to generate a list of matching text choices;
   (e) re-ordering the list of matching text choices using a statistical language model, the statistical language model using usage statistics;
   (f) providing the re-ordered list to a user interface for a determination whether one of the words in the list is the text to be recognized; and
   (g) reiterating steps (b) to (f) until one of the words in the list is the text to be recognized.

2. The method recited in claim 1, wherein the text to be recognized is a single word.

3. The method recited in claim 1, wherein the text to be recognized is a phrase.

4. The method recited in claim 1, wherein the unambiguous data source comprises a mechanical input device.

5. The method recited in claim 4, wherein the mechanical input device comprises a keypad, a keyboard, a pen, a stylus, and/or a touch screen.

6. The method recited in claim 1, wherein the speech recognition techniques comprise a dual-pass technique.

7. The method recited in claim 1, wherein the speech recognition techniques comprise acoustic pattern matching techniques.

8. The method recited in claim 1, wherein the step of receiving the speech waveform occurs prior to the step of receiving the at least one letter.

9. The method recited in claim 1, wherein the step of receiving the speech waveform occurs after the step of receiving the at least one letter.

10. The method recited in claim 1, wherein the step of receiving the speech waveform occurs concurrently with the step of receiving the at least one letter.

11. The method recited in claim 1, wherein the search network comprises a pre-compiled search network.

12. The method recited in claim 1, wherein dynamically determining the search network comprises dynamically generating the search network from a base lexicon.

13. The method recited in claim 1, wherein the units of sound comprises a phoneme.

14. The method recited in claim 1, wherein the unit of sound comprises a syllable.

15. The method recited in claim 1, wherein the unit of sound comprises a word.

16. The method recited in claim 1, wherein the usage statistics is associated with a specific user.

17. The method recited in claim 1, wherein the usage statistics is associated with an application.

18. A system for multi-modal text prediction, comprising:
an unambiguous data source for receiving input corresponding to text to be recognized;
a base lexicon including data that describes waveforms associated with a plurality of textual entries, each entry having a proper spelling, each proper spelling having an initial letter;
a lexicon reducing module, comprising software instructions when carried out by a processor, create a search lexicon from the base lexicon based upon the received input, the search lexicon including entries from the base lexicon having initial letters that correspond to input received from the unambiguous data source;
a speech recognition module, comprising software instructions when carried out by a processor, receive a speech waveform corresponding to the text to be recognized, and pattern-matches the speech waveform to the search lexicon to identify one or more entries in the search lexicon that correspond to the speech waveform; and
a language model module, comprising software instructions when carried out by a processor, re-order the one or more entries using a statistical language model, the statistical language model using usage statistics.

19. A method of multi-modal text prediction, comprising:
(a) receiving a speech waveform corresponding to text to be recognized;
(b) receiving at least one letter corresponding to a portion of the text, the at least one letter being received from an ambiguous data source;
(c) dynamically determining a search network based on the at least one letter, the search network including units of sound based on the at least one letter;
(d) applying speech recognition techniques that pattern-match the speech waveform against the search network to generate a list of matching text choices;
(e) re-ordering the list of matching text choices using a statistical language model, the statistical language model using usage statistics;
(f) providing the re-ordered list to a user interface for a determination whether one of the words in the re-ordered list is the text to be recognized; and
(g) reiterating steps (b) to (f) until the one of the words in the re-ordered list is the text to be recognized.

20. The method recited in claim 19, wherein the step of receiving the speech waveform occurs concurrently with the step of receiving the at least one letter.

* * * * *